(12) United States Patent
Jones et al.

(10) Patent No.: US 8,714,362 B2
(45) Date of Patent: May 6, 2014

(54) SORTING APPARATUS

(75) Inventors: Peter T. Jones, Kennewick, WA (US); Brandon T. Hall, Walla Walla, WA (US); David W. Hufford, Walla Walla, WA (US); Timothy L. Justice, Walla Walla, WA (US); Tracy L. McGowen, Waltsburg, WA (US); Gerald R. Richert, Walla Walla, WA (US); Roydan T. Tomlinson, College Place, WA (US); Jean-Francois Pellet, Walla Walla, WA (US); Quentin F. Kemph, Walla Walla, WA (US)

(73) Assignee: Key Technology, Inc., Walla Walla, WA (US)

(*) Notice: Subject to any disclaimer, the term of this patent is extended or adjusted under 35 U.S.C. 154(b) by 0 days.

(21) Appl. No.: 13/454,887

(22) Filed: Apr. 24, 2012

(65) Prior Publication Data

US 2013/0277284 A1    Oct. 24, 2013

Related U.S. Application Data

(63) Continuation-in-part of application No. 13/373,622, filed on Nov. 22, 2011.

(51) Int. Cl.
*B07B 1/00* (2006.01)

(52) U.S. Cl.
USPC .......................................... 209/245; 209/265

(58) Field of Classification Search
USPC ........ 209/44.2, 245, 264, 265, 644, 397, 932, 209/939
See application file for complete search history.

(56) References Cited

U.S. PATENT DOCUMENTS

| | | | |
|---|---|---|---|
| 1,339,077 A | 5/1920 | Trufant |
| 1,448,479 A | 3/1923 | Bailey |
| 1,681,627 A | 8/1928 | Sawyer |
| 2,228,977 A | 1/1941 | Rogers |
| 2,316,159 A | 4/1943 | Evett |
| 2,792,113 A | 5/1957 | Minera |
| 2,903,134 A | 9/1959 | Ashlock, Jr. |
| 3,023,898 A | 3/1962 | Martin, Jr. |
| 3,191,772 A | 6/1965 | Jones et al. |
| 3,306,440 A | 2/1967 | Russell |
| 3,337,049 A | 8/1967 | Carlsen |
| 3,680,694 A | 8/1972 | Hamann |
| 3,701,565 A | 10/1972 | Gutterman et al. |
| 3,702,656 A | 11/1972 | Gutterman et al. |
| 3,773,172 A | 11/1973 | McClure et al. |
| 4,074,808 A | 2/1978 | Gillespie et al. |

(Continued)

FOREIGN PATENT DOCUMENTS

| WO | WO 00/02036 A1 | 1/2000 |
|---|---|---|
| WO | WO 03/106038 A1 | 12/2003 |
| WO | WO 2007/003763 A2 | 1/2007 |

OTHER PUBLICATIONS

PCT Search Report dated Jul. 16, 2013.

*Primary Examiner* — Michael McCullough
(74) *Attorney, Agent, or Firm* — Paine Hamblen, LLP

(57) ABSTRACT

A sorting apparatus is described, and which includes a conveyor which transports a produce stream for inspection. The conveyor has various regions formed in part of ridges, troughs and apertures which reduce the weight of the produce stream, as well as reduces the vertical and horizontal components of motion of the produce stream, as the produce stream progresses from one end to the other.

32 Claims, 16 Drawing Sheets

(56) References Cited

U.S. PATENT DOCUMENTS

| | | |
|---|---|---|
| 4,140,630 A | 2/1979 | Scarlett et al. |
| 4,176,750 A | 12/1979 | Holmes |
| 4,225,424 A | 9/1980 | Patzlaff |
| 4,279,346 A | 7/1981 | McClure et al. |
| 4,294,691 A | 10/1981 | Patzlaff |
| RE31,169 E | 3/1983 | Holmes |
| 4,513,867 A | 4/1985 | Satake |
| 4,830,194 A | 5/1989 | Kajiura et al. |
| 4,858,769 A | 8/1989 | DeVries |
| 5,148,923 A * | 9/1992 | Fraenkel et al. ............. 209/539 |
| 5,305,888 A | 4/1994 | Meylor |
| 5,305,894 A | 4/1994 | McGarvey |
| 5,398,818 A | 3/1995 | McGarvey |
| 5,544,761 A | 8/1996 | Zdroik |
| 5,683,000 A | 11/1997 | Low |
| 5,791,497 A | 8/1998 | Campbell |
| 5,810,175 A | 9/1998 | Williamson |
| 5,819,951 A | 10/1998 | Sultanovich et al. |
| 5,893,465 A | 4/1999 | Harangozo |
| 6,260,713 B1 | 7/2001 | Brown |
| 6,512,577 B1 | 1/2003 | Ozanich |
| 6,610,953 B1 | 8/2003 | Tao et al. |
| 6,847,447 B2 | 1/2005 | Ozanich |
| 6,992,771 B2 | 1/2006 | Bond et al. |
| 7,166,027 B2 | 1/2007 | Messenger |
| 7,202,434 B2 | 4/2007 | Lofqvist et al. |
| 7,437,791 B2 | 10/2008 | Williamson |
| 7,581,646 B2 | 9/2009 | Barr |
| 7,608,794 B2 | 10/2009 | Pierce |
| 7,975,853 B2 | 7/2011 | Furniss |
| 2004/0011709 A1 | 1/2004 | van Wijngaarden et al. |
| 2006/0113224 A1 | 6/2006 | Williamson |
| 2007/0006563 A1 | 1/2007 | Barr |
| 2007/0006564 A1 | 1/2007 | Barr |
| 2007/0267330 A1 | 11/2007 | Mukai |
| 2008/0283452 A1 | 11/2008 | Barr |
| 2009/0056297 A1 | 3/2009 | Pellenc et al. |
| 2009/0057208 A1 | 3/2009 | Pellenc et al. |
| 2010/0096299 A1 | 4/2010 | Adams et al. |
| 2010/0223899 A1 | 9/2010 | Defurne et al. |
| 2010/0275566 A1 | 11/2010 | Berthet et al. |
| 2011/0031169 A1 | 2/2011 | Folgner et al. |
| 2011/0112684 A1 | 5/2011 | Pellenc |
| 2011/0186405 A1 | 8/2011 | Blanc et al. |
| 2011/0197563 A1 | 8/2011 | Nakas et al. |
| 2013/0126396 A1 * | 5/2013 | Jones et al. .................. 209/44.1 |

* cited by examiner

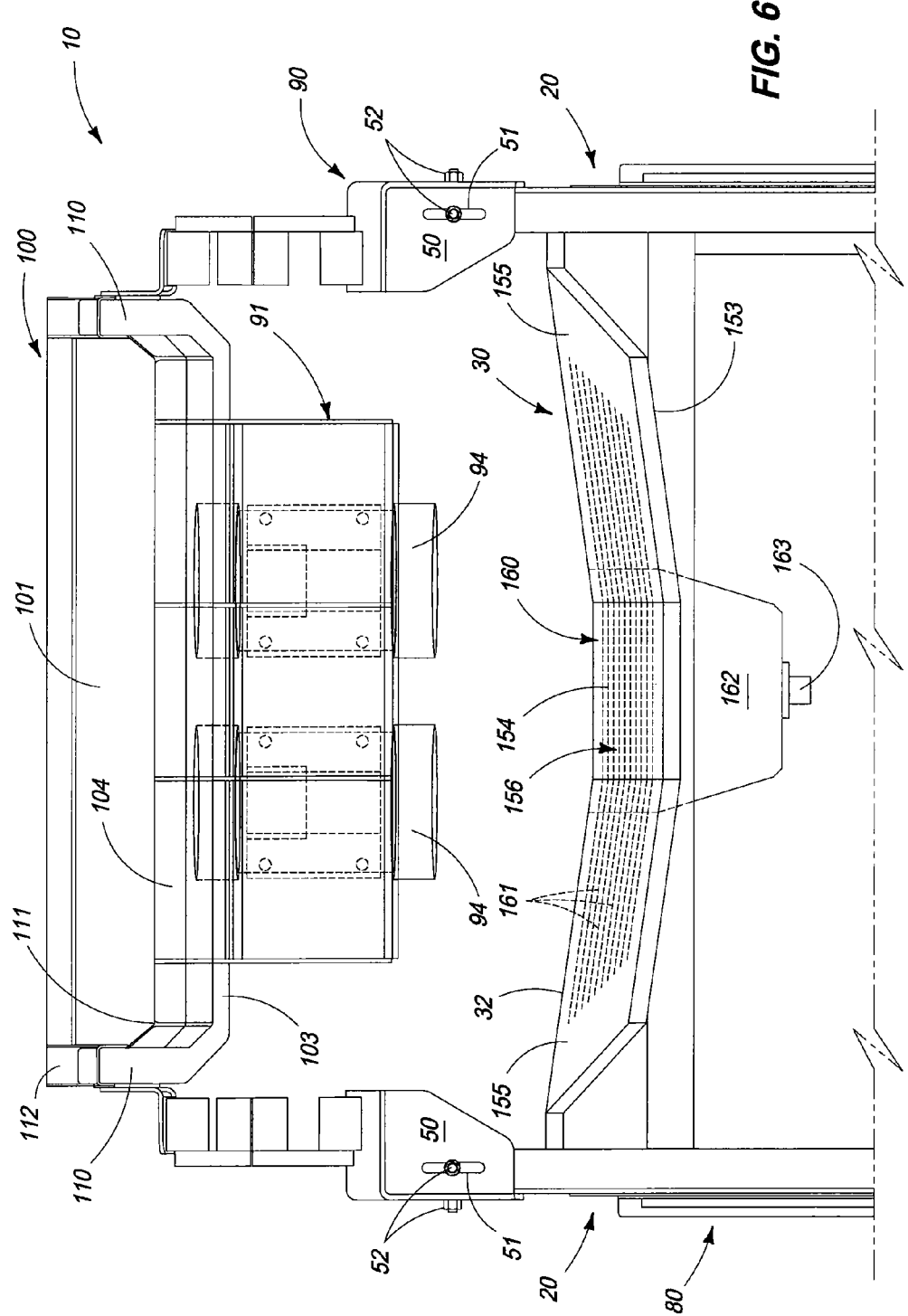

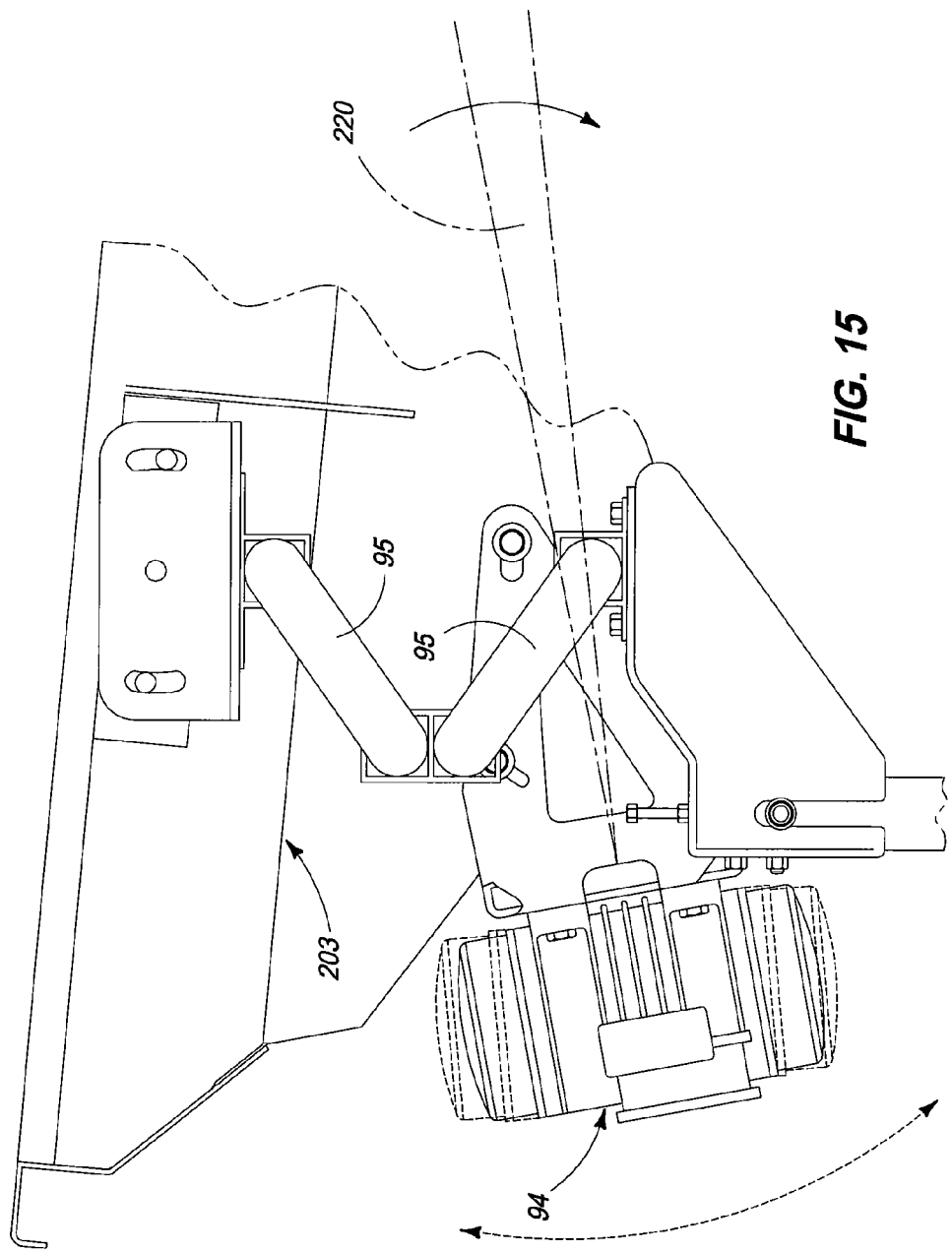

SORTING APPARATUS

CROSS REFERENCE TO RELATED APPLICATION

This application is a Continuation-In-Part of U.S. patent application Ser. No. 13/373,622, which was filed on Nov. 22, 2011.

TECHNICAL FIELD

The present invention relates to a sorting apparatus, and more particularly to an apparatus which finds particular utility, and usefulness, in sorting a produce stream which includes berries.

BACKGROUND OF THE INVENTION

Sorters of various designs for use with grapes, berries, nuts, seeds and similar granular items are well known in the art. Past methodologies for sorting such produce have utilized reciprocating screens of increasing mesh size, as seen in U.S. Patent Publication Number 20070267330 (Mukai); parallel rollers having predetermined gap sizing, as disclosed in U.S. Patent Publication Number 20090057208 (Pellenc); pressurized air flow, as shown in U.S. Pat. No. 2,228,977 (Rogers); water immersion, as seen in U.S. Pat. No. 3,023,898 (Martin); and the rebound characteristics of the product to be sorted as the product is permitted to pass through a series of rebound plates, as discussed in French Patent Number FR2796249A1 (LaFlaquiere). The teachings of the above cited patents are incorporated herein by reference.

A major advance in the technology of sorting various products or produce was the use of imaging devices while the product or produce to be sorted was passing through an inspection zone, and along an arcuately shaped path. This methodology can be seen in U.S. Patent Publication Number 201101212684 A1 (Pellenc), and wherein the product is moved along a conveyor and in a stream, which is then isolated into a single layer. This single layer of product is then passed through an inspection zone where an imaging analysis is performed, and desired and undesired products are then later separated by way of a downstream ejector system. The teachings of this above cited patent publication is also incorporated herein by reference.

While the above cited prior art has provided some measure of success in various industry segments, a major impediment to the sorting of produce such as grapes or other granular items has been the relative size of the machine (the "footprint"), and the simultaneous separation of a liquid phase product component from a solid phase product, component during the sorting process. For example, in U.S. Patent Publication Number 2011 0112684 (Pellenc), the product is moved at a given speed through a substantially horizontally oriented inspection area of the sorting device. While this arrangement works with some degree of success and would appear satisfactory at first analysis, this physical arrangement requires an extension of the imaging area to permit a thorough visual inspection and analysis of the product stream. This particular arrangement ultimately translates into a larger footprint for the resulting sorting device. Additionally, it will be noted that this same horizontal arrangement fails to segregate a liquid phase product component from a solid phase product component, whether for capture or subsequent discard.

The present invention resolves the many issues associated with the foot print size of a resulting sorter, and those problems associated with the segregation or separation of a liquid phase product component from a solid phase product component. The present invention also provides a novel means for producing a produce stream flow which is substantially vertical, rather than horizontal, when the produce stream moves through an imaging area or inspection zone, thus reducing the overall horizontal length of the resulting sorting apparatus. This type of an arrangement permits the resulting sorting apparatus, as a whole unit, to be rendered moveable, and thus enables the apparatus to be utilized at remote locations such as in harvesting areas, and the like. This, of course, further reduces the costs associated with harvesting and sorting a given source of produce.

In the presently disclosed invention, the sorting apparatus as described, hereinafter, effectively segregates or separates a liquid phase product component from a solid phase product component at a location in the sorting apparatus where vertical movement of the product or produce is first introduced. This particularly novel arrangement permits the effective capture of substantially all the liquid phase product component, and further reduces or eliminates the possibility that the liquid phase product component may interfere with the downstream imaging and visual analysis of the solid phase product component as it moves substantially vertically downwardly through an inspection zone or station.

A sorting apparatus which avoids the many shortcomings associated with the prior art devices utilized heretofore is the subject matter of the present patent application.

SUMMARY OF THE INVENTION

A first aspect of the present invention relates to a sorting apparatus which includes a conveyor having a distal end, and which transports a produce stream at a predetermined speed along a first path of travel to the distal end thereof, and wherein the produce stream includes unwanted solid materials and a desired liquid derived from the produce in the produce stream; a product separation surface mounted in spaced relation relative to the distal end of the conveyor, and wherein the produce stream, including the unwanted solid material, passes thereover and the horizontal and vertical components of motion are substantially reduced such that the produce stream falls substantially, immediately, vertically downwardly therefrom, and wherein the liquid in the produce stream is separated from the produce stream by the product separation surface, and travels gravitationally, downwardly along a liquid pathway which moves in a second path of travel; an inspection zone located downstream relative to the product separation surface, and wherein the produce stream including the unwanted solid material passes therethrough for visual inspection; an imaging device for visually inspecting the produce steam passing though the inspection zone; an illumination device for illuminating the produce stream passing through the inspection zone; and an ejector assembly located downstream of the inspection zone and which removes the unwanted solid material and individual produce in the produce stream having undesirable characteristics.

Still another aspect of the present invention relates to a sorting apparatus for berries which includes a frame having a multiplicity of substantially vertically oriented members which are fastened together by a plurality of horizontally oriented members; a vibratory conveyor chassis mounted on the frame and which moveably supports an angulated vibratory tray, having a proximal and a distal end, and which conveys a source of berries to be sorted in a produce stream from the proximal to the distal ends thereof, and wherein the produce stream moves to the distal end of the vibratory tray by way of the influence of gravity and vibratory induced force imparted to the produce stream, and wherein the vibratory tray has formed therein regions comprised of a multiplicity of substantially parallel ridges and troughs, a multiplicity of elongated converging and diverging apertures, a multiplicity of substantially transverse apertures, and a multiplicity of narrow, transverse slots and which are located sequentially between the proximal and distal ends of the vibratory tray, and wherein the source of berries includes unwanted solid material, and a liquid derived from the produce in the produce stream, and wherein at least some of the unwanted solid material, and some of the liquid, moves under the influence of gravity through the openings inherent in the various regions described above, and is thereby removed from the resulting produce stream; a backwardly inclined product separation surface, mounted on the frame, and which is located in an orientation which is inferior to the distal end of the vibratory tray, and which has an acute angular relationship relative to the vibratory tray, and wherein the produce stream passes over the product separation surface, and is separated into a liquid phase, and a solid phase, and wherein the liquid phase of the produce steam moves in a substantially gravity induced, angularly downwardly directed liquid pathway, while the solid phase of the produce stream moves in a gravity induced, substantially downwardly directed vertical pathway, and wherein the liquid moves in a direction which is substantially opposite to the produce stream movement which is induced by the vibratory tray, and substantially tangential to the gravity induced substantially downwardly directed vertical pathway of the solid phase of the produce stream; an inspection zone located downstream of the product separation surface, and along the downwardly directed vertical pathway of the solid phase of the produce stream; an illumination device mounted on the frame, and which is located inferior to the backwardly inclined product separation surface, and which is spaced from the gravity induced substantially vertical pathway of the solid phase, and wherein the illumination device, when energized, emits electromagnetic radiation which illuminates the solid phase of produce stream passing through the inspection zone; an imaging device mounted on the frame, and located inferior to the liquid phase pathway, and which is operable to image the illuminated solid phase as the solid phase of the produce stream travels along the gravity induced substantially vertical pathway, and through the inspection zone; an ejector assembly mounted on the frame, and which is located inferior to the backwardly inclined product separation surface, and downstream relative to the inspection zone, and wherein, when activated, the ejector assembly individually separates the unwanted solid material, and individual produce having undesirable characteristics, from the solid phase to form a substantially desired produce stream; a controller mounted on the frame, and which is further operationally coupled with the imaging device, and which sends an electrical signal to the ejection device so as to induce the ejection device to remove unwanted solid material, and individual produce having undesirable characteristics, from the solid phase produce stream; a first solid phase collection container for collecting the desired produce stream and which is located inferior to the ejection device, and wherein the solid phase collection container temporarily stores the desired produce stream, and wherein the liquid phase pathway is coupled in liquid delivering relation relative to the first solid phase collection container; a second solid phase collection container for receiving the unwanted solid material, and individual produce having undesirable characteristics, and wherein the second solid phase collection container is located inferior to the ejection assembly; and a liquid phase collection container, which is mounted on the frame, and located distally relative to the liquid phase pathway, and which collects the previously separated liquid which is derived from the produce stream and is coupled in fluid flowing relation relative to the first solid phase collection container.

Still another aspect of the present invention relates to a conveying surface mounted upon the vibratory tray which has a region defined in parallel spaced ridges and troughs, as well as a regions defined by various and spaced apertures. These regions defined by ridges and troughs, and apertures, promote the collection of a liquid component of the produce stream and the further separation of non-desired objects from desired produce, and has the further purpose of causing the individual products of the produce stream to segregate, and spread out such that the produce stream becomes substantially uniform in depth, and substantially evenly distributed as the produce stream moves from the intake end to the discharge end. The aforementioned ridges and troughs, and assorted apertures have the further benefit of greatly reducing the horizontal and vertical components of motion of the produce stream such that the produce stream which is very converged and has very little vertical motion and horizontal motion components upon reaching the discharge end of the conveying surface.

These and other aspects of the present invention will be discussed in greater detail, hereinafter.

BRIEF DESCRIPTION OF THE DRAWINGS

Preferred embodiments of the invention are described below with reference to the following accompanying drawings:

FIG. 6 is a fragmentary, transverse, vertical, sectional view taken from a position along line 6-6 of FIG. 2.

FIG. 15 is a fragmentary, side elevation view of an adjustable vibratory motor mount which is employed with the present invention.

DETAILED DESCRIPTION OF THE PREFERRED EMBODIMENTS

First Form

This disclosure of the present invention is submitted in furtherance of the Constitutional purposes of the U.S. Patent Laws "to promote the progress of science and useful arts" [Article 1, Section 8].

Figure 1:
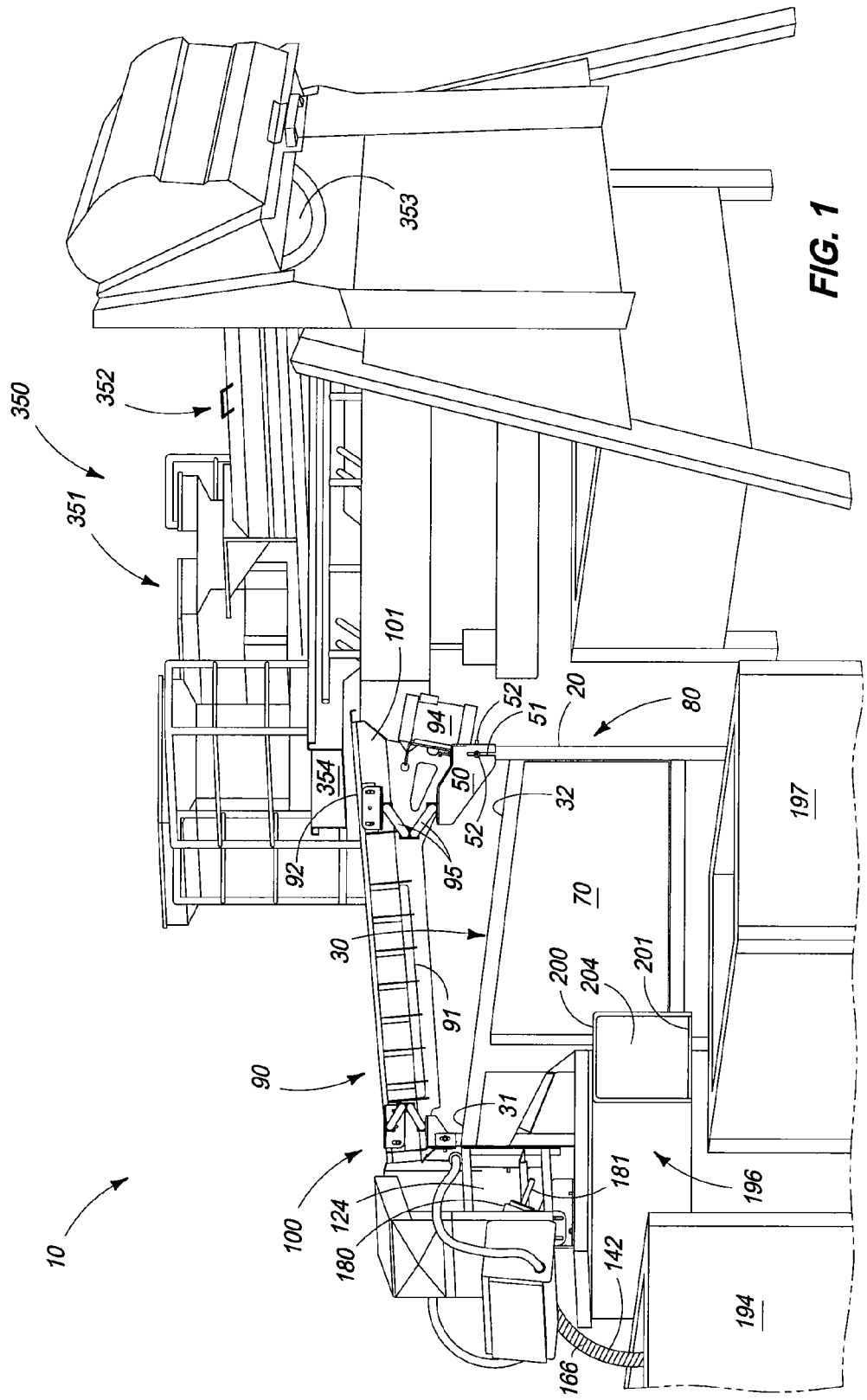
FIG. 1 is a perspective, environmental view of the present invention shown in a typical operational configuration.

A sorting apparatus of the present invention is generally indicated by the numeral 10, in FIG. 1 and following. The present invention has particular utility for sorting granular products, such as berries, nuts, seeds, and other objects of interest, and in particular a product or produce stream 11 containing these products or produce. The produce stream 11 which is depicted includes both unwanted solid material 12, and a desirable liquid material 13 which is typically derived, at least in part, from the produce which makes up the produce stream 11. The present form of the invention, as shown, is for sorting of grapes. The produce stream of grapes also includes individual produce representing desirable berries 14, and undesirable berries 15, as well as unwanted solid material which may include, but is not limited to, stems, 16, leaves, 17, and other harvest related debris 18. The liquid material portion or fraction 13 is derived, at least in part, from the juice of grapes in the produce stream 11 which have either earlier or recently ruptured, or been crushed during the harvesting or sorting process. The desirable liquid 13 travels with, and is entrained in the produce stream 11. The present invention 10 is shown resting on the surface of the earth 19 by a multiplicity of supporting legs which are generally indicated by the numeral 20.

Figure 2:
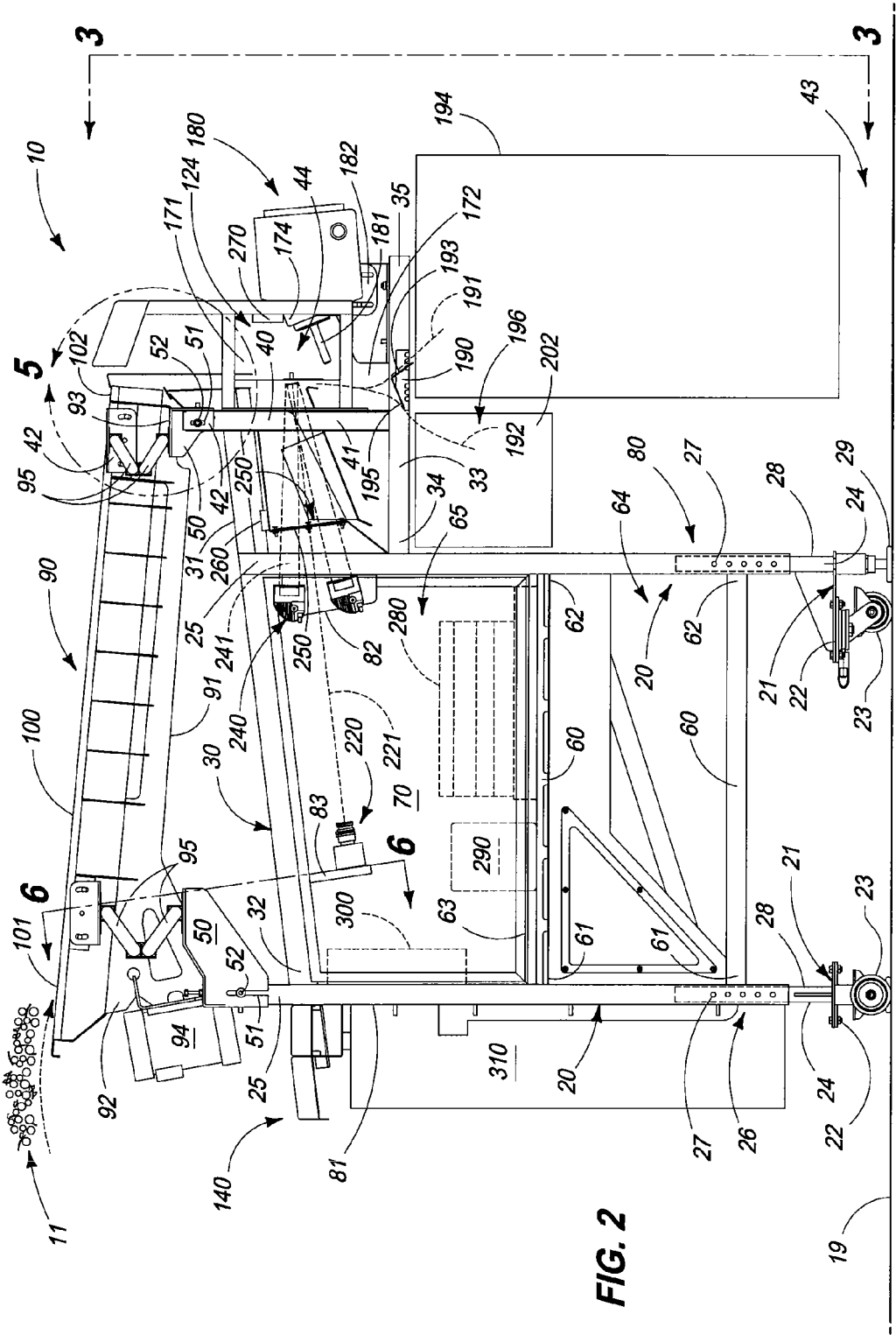
FIG. 2 is a first, side elevation view of the present invention, and with some underlying surfaces shown in phantom lines.

The respective supporting legs each include a base member 21, which is located adjacent to the surface of the earth 19. As depicted, the base member comprises a square-shaped base plate 22. In the form of the invention as seen in FIG. 1, an earth engaging wheel assembly comprising either a fixed or moveable castor 23 is mounted on the base plate 22 by utilizing conventional screw-threaded fasteners. The earth engaging wheels 23 facilitate the movement of the present invention 10 to various remote locations such as to the edge of a harvesting area, not shown. The respective supporting legs 20 each have a first or proximal end 24 which is affixed to the base member or plate 21 by welding and the like, and an opposite, distal or second end 25. The individual supporting legs 20 are constructed or fabricated from stainless steel, steel, iron, aluminum or other rigid metallic stock or product. The supporting legs 20 have a given length dimension which can be variably adjusted. As seen in FIG. 2, a height adjustment arrangement 26 is located near, and made integral with the first or proximal end 24 of each of supporting legs. This height adjustment arrangement includes a multiplicity of spaced, longitudinally oriented apertures 27, which are formed in the proximal end 24 and which receive a fastener or pin, not shown therein. A telescoping leg portion 28 is provided and is secured in various coaxially extending orientations by the fastener received in the apertures, 27, so as to allow a user, not shown, to coarsely level-up the sorting apparatus 10 in the event the invention is used on an uneven or unlevel underlying supporting surface 19, such as might be present on the edge of a harvesting area or the like. A means for finely adjusting the level 29 of the apparatus 10 is provided. This allows a fine leveling adjustment to be made between the coarse adjustments allowed by the pins which are received in the apertures 27.

Mounted near the second or distal ends 25 of each of the supporting legs 20, is a concavely shaped platform, or top surface 30 which is located in an angulated, non-horizontal orientation. This same top surface 30, is utilized, at least in part, for the collection of the liquid material 13, and some of the unwanted solid material 12 as will be discussed in greater detail, below. The top surface 30 has an upwardly located or vertically elevated first end 31, and a lower, vertically, downwardly oriented, second end 32. As seen in FIG. 2, the first end 31 extends laterally outwardly beyond the supporting legs 20. The frame further includes a pair of horizontal support members 33 having a first end 34 which is affixed to at least two of the supporting legs 20, and which are located below the laterally outwardly extending portion of the top surface 30. These respective, horizontal support members have an opposite, second end, 35. Extending normally upwardly relative to the horizontal support members 33 is a pair of vertically oriented support members 40. The respective vertical support members 40 each have a first end 41, which is suitably affixed to one of the horizontal support members 35 at a location which is intermediate the opposite first and second ends thereof, 34, and 35 respectively, and a distal second end 42. The first end of the platform 30 is affixed near the second end 42, and is supported thereby. As best seen in FIG. 2, the first pair of horizontal support members 33 are located in predetermined spaced relation one relative to the others. A gap or space 43 is defined by the horizontal support members 33, the supporting legs 20, and the surface of the earth 19. This gap 43 will receive several collection containers which will be discussed in greater detail, hereinafter. Further as will be seen in FIG. 2, a space 44, is created therebetween the horizontal support member 35, and the overhead, laterally extending portion of the top surface 30. This space will receive various other components of the present invention 10, and which will be discussed in greater detail in the paragraphs which follow.

Figure 3:
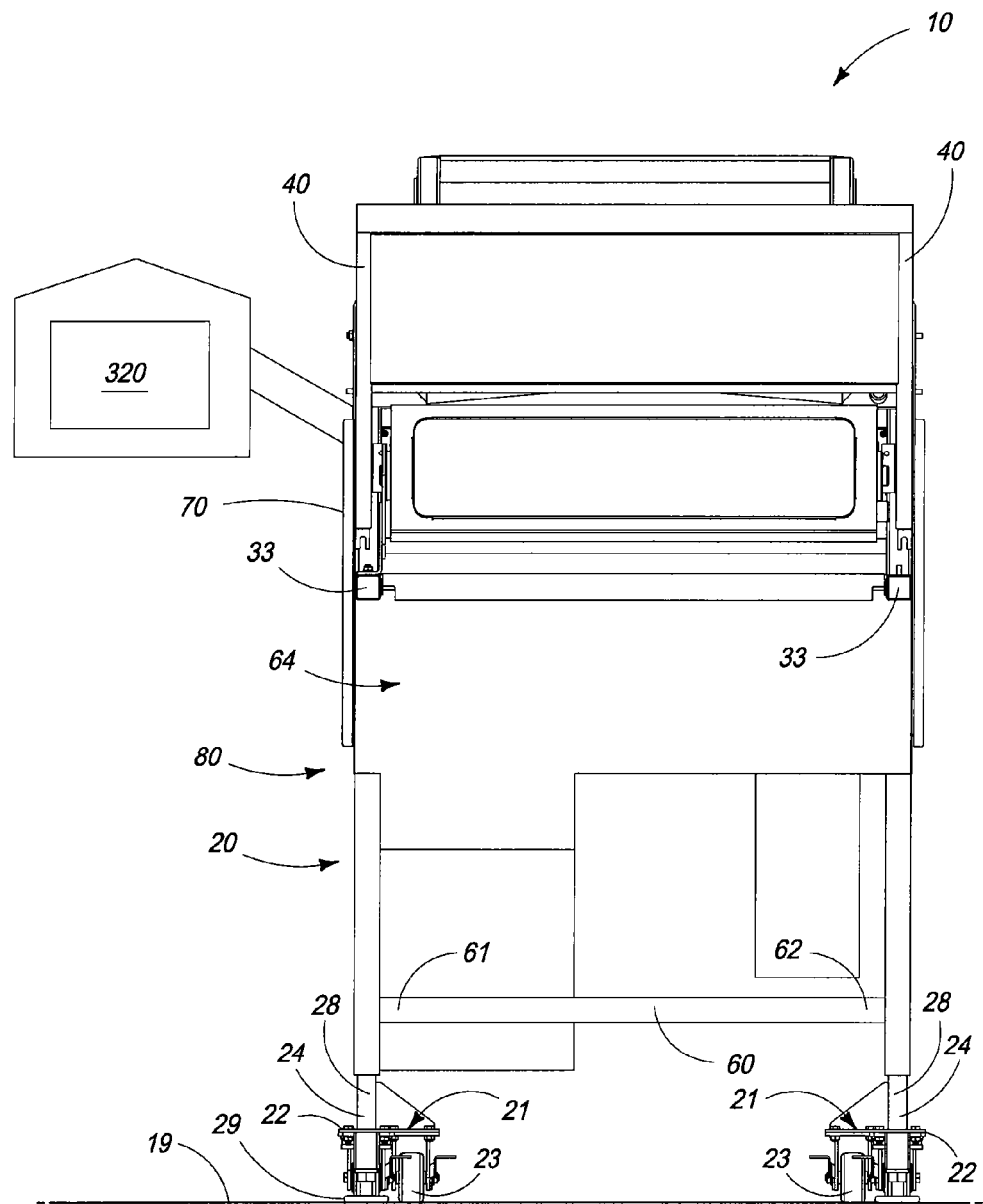
FIG. 3 is a second, side elevation view of the present invention, and which is taken from a position about 90 degrees offset from that seen in FIG. 2.
Figure 5:
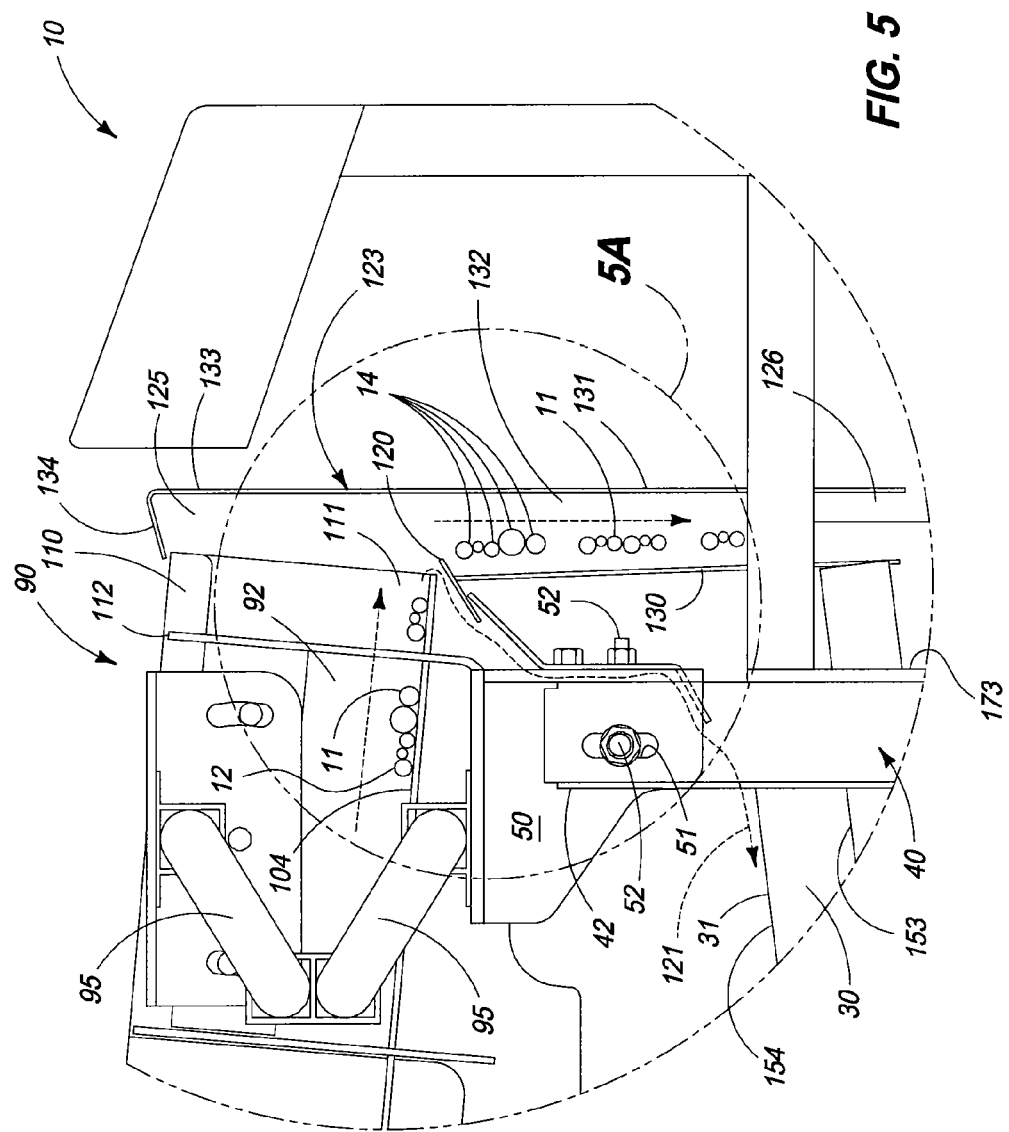
FIG. 5 is a fragmentary, side elevation view of one feature of the present invention.

As seen in FIGS. 3, 5 and 6, and mounted on the second or distal end 25 of one pair of the supporting legs 20, and also on the respective second ends 42, of each of the vertical support members 40, are individual mounting brackets 50. The respective mounting brackets are utilized to secure a conveyor, here illustrated as a vibratory conveyor, which has a vibratory tray, or pan, in a spaced, angularly inclined orientation relative to the top surface 30. The conveyor, as illustrated, is discussed in the paragraphs which follow. Each of the mounting brackets includes an engagement portion which has formed therein narrowly elongated slots 51. The respective slots 51 will receive a fastener, 52, therethrough and which individually engage the underlying surface of each of the supporting legs 20, or vertical support members 40 as the case may be. The individual slots 51 allows the conveyor, which is supported thereby, to be moveably adjusted in both the vertical, and horizontal planes, so as to provide an appropriate amount of downwardly sloped pitch or angle, to the conveyor which is located above same. As best seen in FIGS. 5 and 6, each of the mounting brackets 50 haves two slots 51 formed therein, and which are oriented in a substantially perpendicular relationship one relative to the other, and which provides the means so as to adjust the conveyor in the vertical, and horizontal planes.

The present invention 10 further includes a multiplicity of horizontally oriented frame members, which are generally indicated by the numeral 60, and which are located at varying intervals along the longitudinal length of the respective supporting legs 20. The horizontal frame members 60 have opposite first, and second ends 61 and 62, respectively, and which are affixed to the individual supporting legs 20 by means well known in the art, such as by various fasteners or by welding and the like. The horizontal frame members 60 are typically constructed of stainless steel, steel, iron, aluminum or other rigid metallic products which are similar to the materials used in the fabrication of the supporting legs 20. The present invention 10 further includes an interior, horizontally oriented supporting surface 63 which is located a fixed, inferior distance from the platform or top surface 30, and which is further mounted on at least some of the horizontal frame members 60. The horizontal surface 63 thereby creates or defines a first and second internal cavity 64 and 65, respectively, which receive and support various subassemblies including, but not limited to a UPS; a computer, having a controller; an illumination assembly, and an imaging device. All of these structures, and others will be discussed in greater detail, below. The interior horizontal supporting surface 63 is affixed to the respective horizontal frame members 60 by means well known in the art, such as by rivets, welding or other screw-threaded fasteners. The present invention 10 also includes vertical, exterior facing side walls, which are generally indicated by the numeral 70, and which are located between the horizontal supporting surface 63 and the top surface 30. The vertical side walls 70 are typically constructed of a lightweight rigid, metal or synthetic sheet or panel which is well known in the art. The purpose of the vertical side walls 70 is to prevent dust or other contaminants from entering the second cavity 65, and thereby causing a malfunction of the equipment or subassemblies positioned, therein.

The horizontal frame members 60 are arranged in a predetermined pattern so as to orient the respective supporting legs 20 in a substantially vertical position, and form a resulting rectangularly shaped frame 80 that is easily moveable along the surface of the earth 19, and which can be quickly made substantially operationally level notwithstanding the orientation of the underlying surface of the earth 19. The frame 80 also includes mounting brackets 81, which are located near the second or distal end 25 of one pair of the supporting legs 20, and underneath the second end 32 of the top surface 30. The mounting brackets 81 are utilized for mounting a power distribution panel, as will be discussed below, on the frame 80. As seen in FIG. 1, the present invention 10 also includes mounting brackets 82 which are located on the frame 80, and which are located within the second cavity 65. The mounting brackets 82 are utilized for mounting an illumination assembly, in an appropriate orientation. The illumination assembly will be discussed in greater detail, below. Furthermore, an additional mounting bracket 83 is provided within the second cavity 65, and mounted on the frame 80. The mounting bracket 83 is located below the top surface 30, and is utilized to support an imaging device which will also be described in greater detail, hereinafter.

The present invention 10 includes a vibratory tray, pan or conveyor 90, which can best be seen in FIGS. 1, 3 and 5, respectively. The vibratory conveyor 90 is spaced, in an opposite, angularly inclined orientation relative to the top surface 30. Further, the vibratory conveyor 90 is held in this predetermined orientation by the individual mounting brackets 50. The vibratory conveyor 90 has a supporting frame or chassis 91 which is fastened to the respective mounting brackets 50. The frame is of conventional design, and has first end 92, and a second end 93. The frame 91 is spaced from, and located above, the underlying top surface 30. Mounted on the first end of the vibratory conveyor 90 is a pair of electrically energizable and moveably adjustable vibratory motors which are indicated by the numeral 94. The vibratory motors 94 impart a source of vibratory energy, in the form of a reciprocal stroke, of a given magnitude, to the frame 91. The angle of energy transfer between the vibratory motors 94 and the frame 91, or what has heretofore been formed the "stroke angle," is adjustable so as to, on the one hand, induce aggressive bouncing and product spreading of the product stream 11 at the first, proximal or receiving end 101 of the product transporting tray, pan or conveying surface 100 and on the other hand to minimize bouncing and product spreading, while inducing more product roll and shear, of the product stream 11, at the second, distal or discharge end 102 of the product transporting tray, pan or conveying surface 100. Further, and attached near the first and second ends 92, and 93 of the frame 91 are opposite pairs of resilient, biasing springs members or vibratory isolators 95. Vibratory energy generated in the moveably adjustable vibratory motors 94 is transmitted directly to the overhead product transporting tray, pan or conveying surface, which is generally indicated by the numeral 100. The vibration isolators 95 are generally effective in isolating greater than about 97% of the vibratory energy found at the top of the vibration isolators 95 from the bottom of the vibration isolators 95, and further substantially prevents vibratory energy from entering the remainder of the present invention 10 through the vertical members 20 and 40. This aforementioned vibratory energy, in combination with the effects of gravity causes the produce stream 11 to move at a predetermined speed which is variable along the product transporting tray 100. In the present arrangement, the respective vibratory motors 94 are moveably adjusted so as to cause the speed of the produce stream 11 to be reduced to a minimum before the produce stream 11 leaves the product transporting tray as will be discussed in greater detail, below. The produce stream 11 moves along a path of travel which extends between the first and second ends 101 and 102, respectively.

The product transporting tray, pan or conveying surface 100 (FIG. 4) has a first, proximal or produce receiving end 101, and a second, distal or produce discharge end 102. The product transporting tray, or conveying surface 100 has a first, inferior, or bottom surface 103, and a second, superior or top surface 104. As will be appreciated from a study of FIGS. 1 and 3, the second, or top surface 104 is operable to support and transport the produce stream 11 to be sorted, for movement at a given speed, and along a first path of travel from the first end 101, to the second end 102, thereof. The top or superior surface 104 is formed in a manner to define a channel region 105. The product transporting tray 100 is further comprised of a pair of spaced, substantially vertical sidewalls 110, which extend generally vertically, upwardly, from the top surface 104. Each of the vertical side walls have a first, or proximal end 111 which is located adjacent to the superior surface 104 of the product transporting tray 100, and a second, or distal end 102. The vibratory tray is constructed or fabricated from stainless steel, steel, iron, aluminum or other rigid metallic product or stock which can be easily cleaned and can be used with the produce stream 11.

Figure 4:
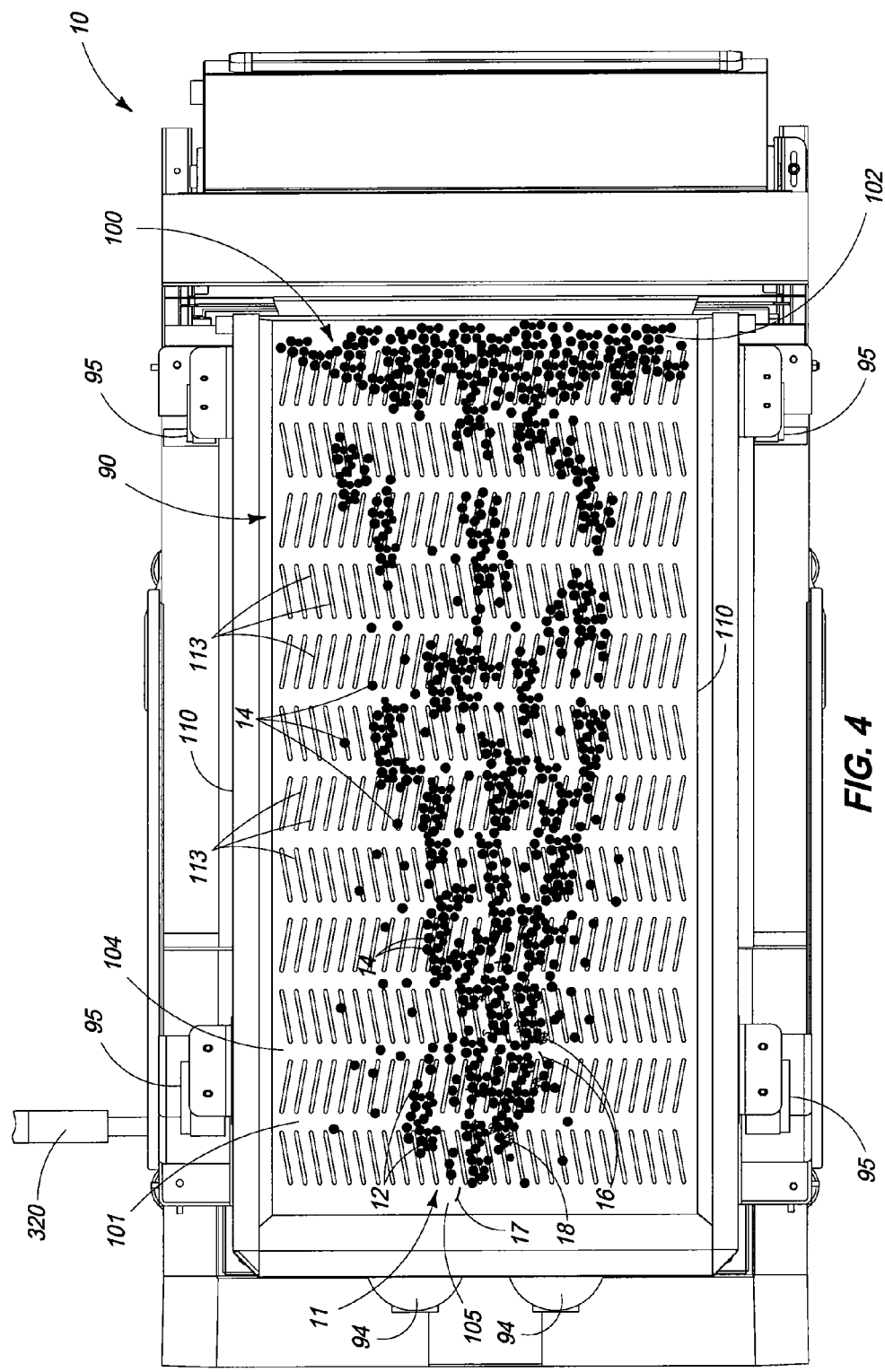
FIG. 4 is a top, plan view of the present invention.

The second, top, or superior surface 104 of the product transporting tray 100, as depicted in FIGS. 3 and 5 is generally planar. Located in a position intermediate the first and second ends 101 and 102, respectively, of the product transporting tray 100 are a multiplicity of substantially elongated apertures or slots 113 which extend therethrough the surfaces 103 and 104, respectively. The elongated slots 113 may have variable length, and width dimensions, and overall shapes. For example, the cross sectional dimensions of the respective apertures 113 may increase in size as those dimensions are measured along a line which extends between the proximal, or receiving end 101 of the product transporting tray 100, to the second or distal end thereof 102. The respective elongated slots or apertures 113 are designed to eliminate at least in part, the unwanted harvesting debris 18, and other unwanted material which has been mixed with the produce stream 11, and which may include stems 16, leaves 17. The aforementioned unwanted material passes through the apertures 113, under the influence of gravity and vibratory motion, and falls, for collection, on the top surface 30. This separation action causes the produce stream 11 to become increasingly more uniform, and desirable, as the produce stream 11 moves from the first end 101 to the second end 102. Further, and by studying the drawings it will be understood that the elongated apertures 113 cause the individual produce making up the produce stream 11, for example, individual grapes, to move in a non-linear fashion down the product transporting tray 100 between the first and second ends 101 and 102, respectively. In particular, the angulated elongated slots 113 cause the respective grapes to roll and tumble from side-to-side. This movement has the effect of dislodging debris 18, which may be clinging to the individual produce, and further is effective in breaking up clusters of the produce which may be clinging or adhering together. Additionally, this non-linear movement causes the produce stream 11 to spread out across the width of the product transporting tray 100 so as to cause the produce stream 11 to become substantially only one berry thick, for example, by the time the produce stream 11 reaches the second or distal end 102, thereof. This is best seen in FIG. 4. Other possible arrangements are possible including providing a rigid screen or perforated pan and which includes a collection zone under same to collect unwanted solid materials. In this type of arrangement, increasing amounts of unwanted solids would be removed, and increasing amounts of liquid 17 would be collected.

Figure 5A:
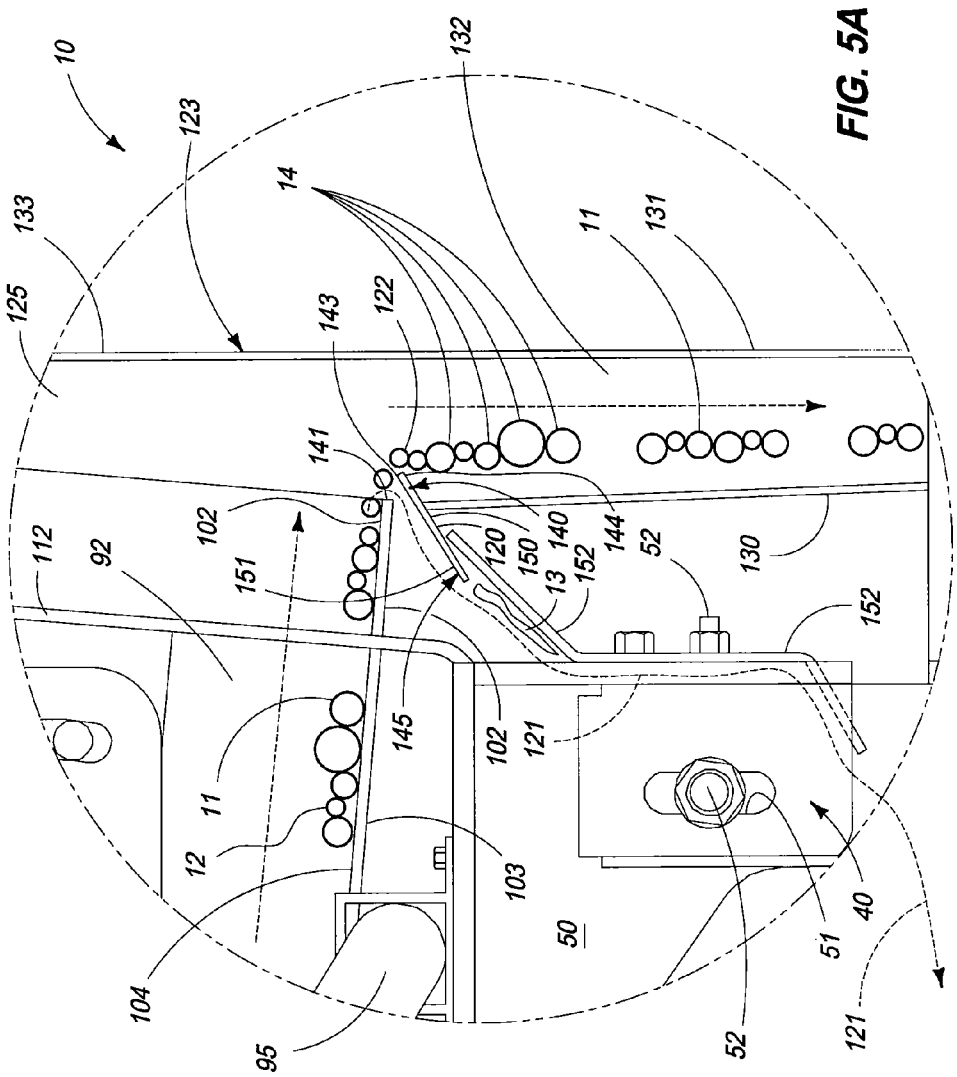
FIG. 5A is a greatly enlarged partial, side elevation view taken from FIG. 5.
Figure 7:
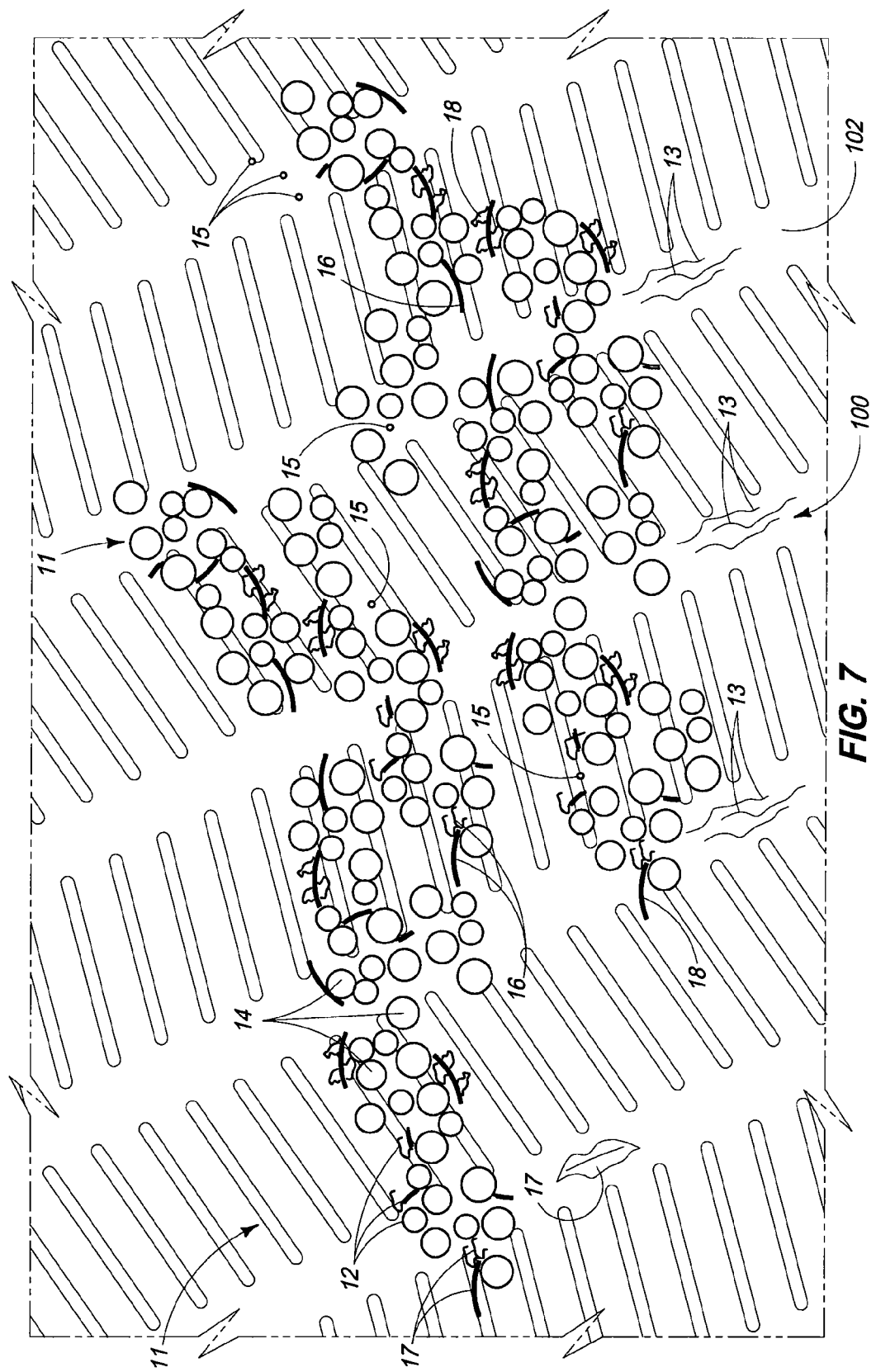
FIG. 7 is a greatly enlarged, fragmentary, plan view of the product conveying surface employed with the present invention.
Figure 8:
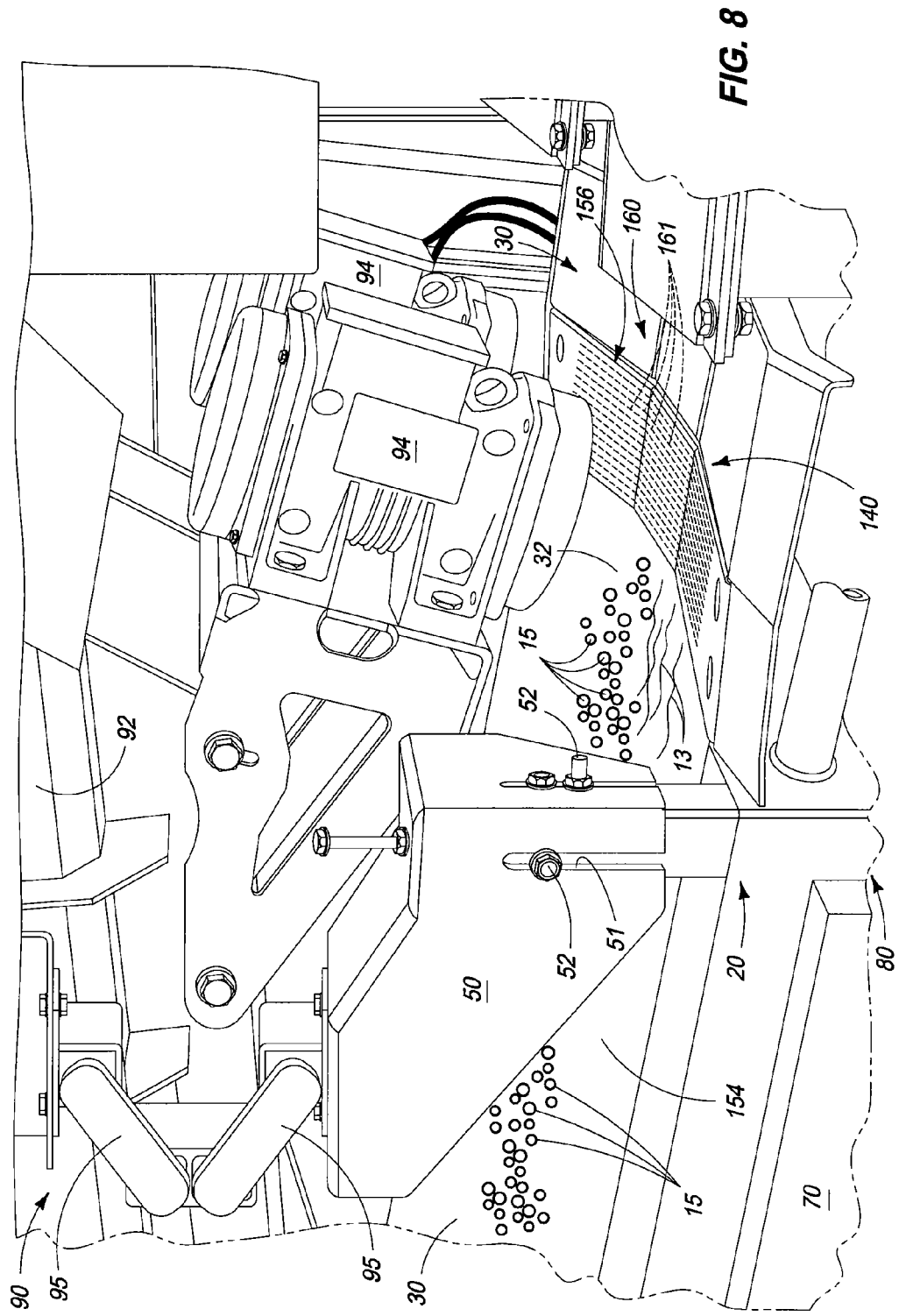
FIG. 8 is a greatly enlarged, fragmentary, side elevation view of yet another feature of the present invention.
Figure 9:
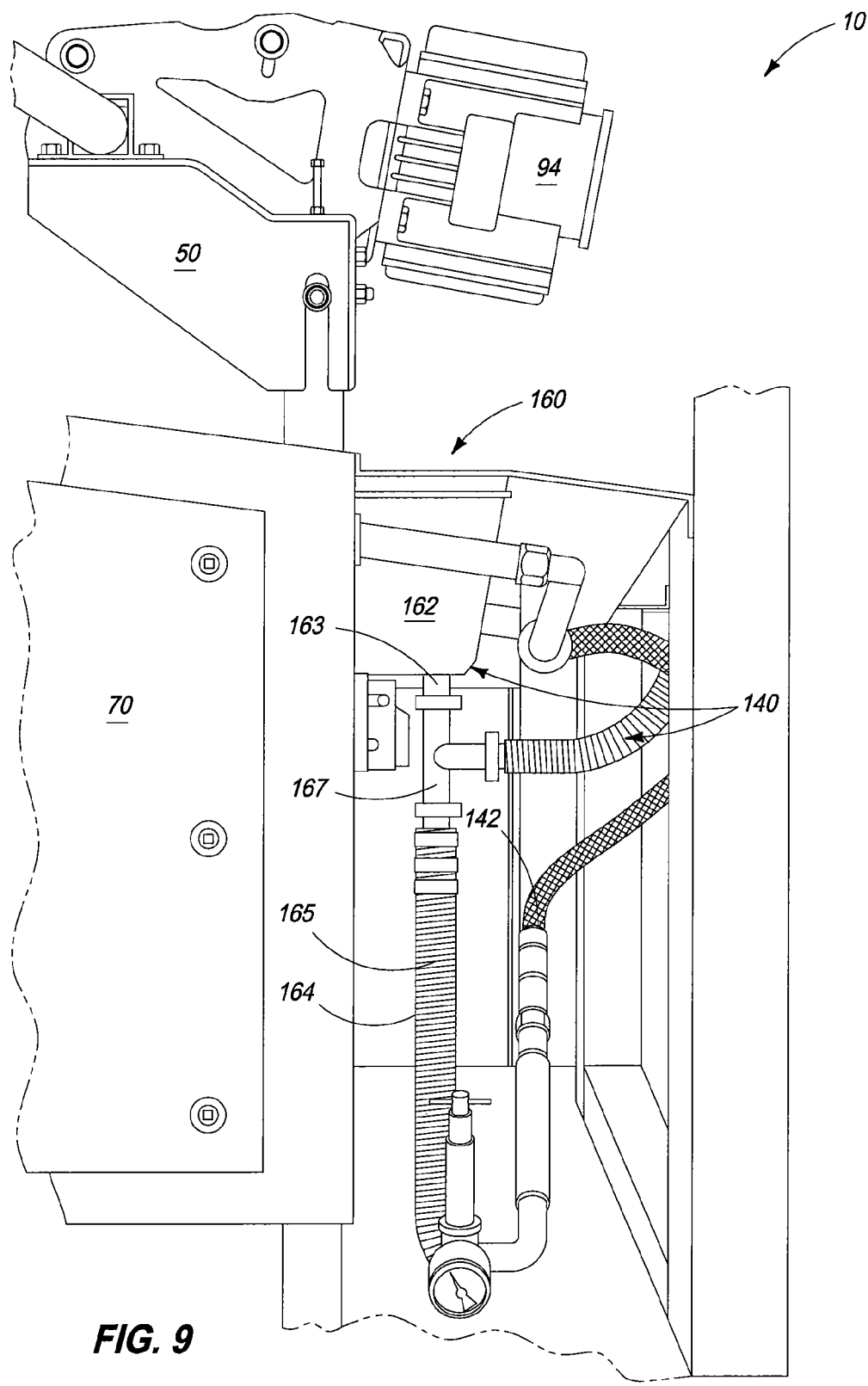
FIG. 9 is a greatly enlarged, side elevation view of still another feature of the present invention.
Figure 10:
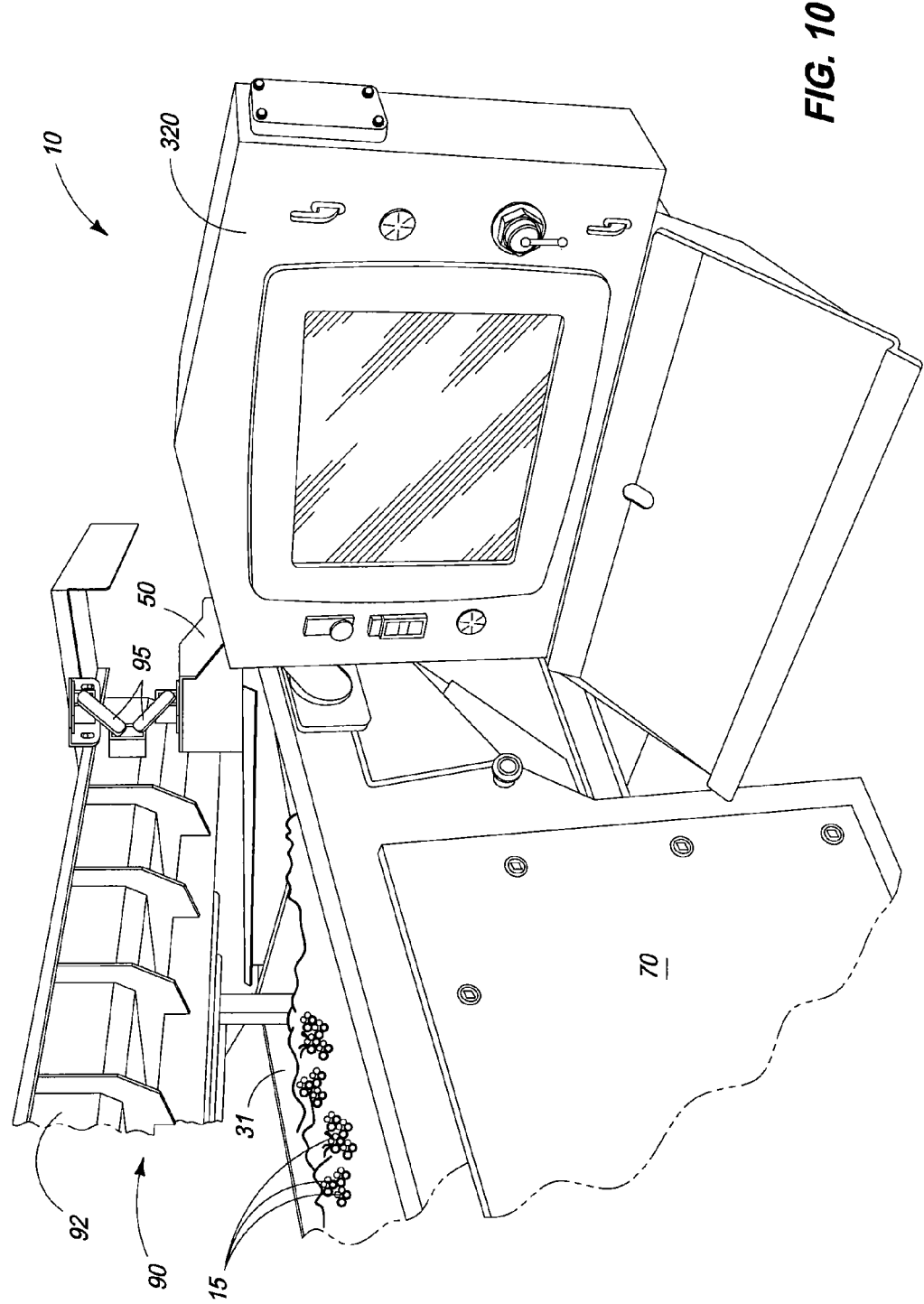
FIG. 10 is a fragmentary, side elevation view showing the operator controls of the present invention.

Following the movement of the produce stream 11 along the second, top, or superior surface 104 of the product transporting tray 100, the speed of horizontal movement of the produce stream 11 is substantially reduced at the second or distal end 102. After leaving the distal end 102 of the product transporting tray 100 the produce stream 11 passes over, and thereby frictionally engages, a backwardly inclined product separation surface or plate 120. This backwardly inclined product separation surface 120 is effective in separating the produce stream 11 into a separate liquid phase produce stream or liquid pathway 121, having the desired liquid 13; and a solid phase product stream 122 which is substantially devoid of the liquid 13, and which moves on for further processing. (FIG. 5A) In the case of the present invention 10, and if the produce to be sorted comprises a stream of grapes, for example, some of these grapes may have become ruptured or even crushed due to the earlier upstream harvesting process (as will be discussed, hereafter), and the liquid phase produce stream 122 includes desired grape juice which a wine producer, for example, would want to recover for further use and processing. The processing and movement of the liquid phase produce stream 122 will be discussed in greater detail, below. The backwardly inclined product separation surface 120 is vertically adjustable so as to provide varying amounts of frictional engagement with the produce stream 11, and to further provide a convenient means for adjusting the size of the intake opening of a liquid collection channel which will also be described, below. Additionally, by adjustment of this structure, small undesirable berries may be removed from the produce stream 11. The solid phase produce stream 122 then enters a substantially vertically oriented produce delivery channel 123 which delivers the solid phase product stream 122 to a downstream inspection zone 124. The features and operation of the inspection zone 124 will be described in greater detail, below.

The produce delivery channel 123 has a first, proximal, or produce receiving end 125, and a second, distal or produce discharge end 126. The produce delivery channel 123 is further comprised of, or defined by, a first, proximally positioned, and substantially vertically oriented panel or plate 130 which is generally located in an immediately inferior position relative to the backwardly inclined product separation plate 120, and which extends generally vertically, downwardly from the backwardly inclined product separation plate 120. The produce delivery channel 123 is further comprised of, or defined by, a second, more distally positioned, spaced, and substantially vertically oriented panel or plate 131, which extends generally vertically upwardly and downwardly from the backwardly inclined product separation plate 120. As can be seen in the drawings, and particularly in FIG. 5, the first and second panels 130, and 131 respectively, are oriented in predetermined spaced relation, and define a passageway 132, therebetween, and which further allows the solid phase produce stream 122 to pass therethrough, or therebetween, to the downstream inspection zone 124. As can further be seen by studying the drawings, this passageway 132 has a diminishing cross sectional dimension when this dimension is measured in a direction extending vertically, downwardly from the backwardly inclined produce separation surface 120, and in the direction of the inspection zone 124, which will be described, below. As can be seen further from the drawings, the generally upwardly extending portion 133 of the second panel 131 is formed into a cover 134 which extends over the produce stream 11, as it departs or leaves from the second end 102 of the product transport tray 100, and thereby substantially prohibits the entry of unwanted particulate matter or debris from being added to the produce stream 11 and which may be derived from the immediate ambient environment or otherwise.

Both the proximal and distally-positioned, and generally vertically oriented panels, 130, and 131 have the same width dimension as the product transporting tray 100, and further individually extend generally vertically, downwardly, to the superior portion of the inspection zone 124. As noted briefly, above, the proximal and distal generally vertically oriented panels 130, and 131, respectively, are adjustably, oppositely spaced so as to form the width dimension of the channel or passageway 132. This width dimension mimics or is only just minimally larger relative to the width dimension of a single layer of the produce stream 11 which is travelling along or through same. The proximal and distally positioned and generally vertically oriented panels 130, and 131 are constructed or fabricated from stainless steel, iron, aluminum or other rigid metallic or synthetic product or stock, and which can be easily cleaned, and can be used or came into contact with the produce stream 11. The proximal and distal substantially vertically oriented panels 130 and 131 are borne by the frame 80, and are affixed thereto by means well known in the art.

The present invention 10 includes a liquid phase capture, and retention assembly 140, which is generally depicted in FIGS. 1-9. The liquid phase capture and retention assembly 140 has a first or liquid intake end 141, and a second or discharge end 142. The liquid phase capture and retention assembly 140 begins at the backwardly inclined product separation surface 120, and is operable to separate any liquid or liquid material 13 forming the liquid phase produce stream 121, and which is mixed or entrained in the produce stream 11, from the solid phase produce stream 122. As earlier discussed, the backwardly inclined product separation surface 120 is located inferior to the distal end 102 of the product transporting tray 100. As illustrated, in the drawings, the backwardly inclined product separation surface 120 is oriented in an acute, angular and vertically adjustable relationship relative to the product transporting tray 100. When the produce stream 11 leaves the distal end 102 of the product transporting tray 100 any liquid material 13 forming the liquid phase produce steam 121, moves, under the influence of gravity, into the first, liquid intake end 141. More specifically, and as illustrated, a liquid collection channel 143 is defined between the backwardly inclined product separation surface 120, and the distal end 102 of the product transporting tray 100. This liquid collection channel 143 forms the first liquid intake end 141, and receives the liquid phase produce stream 121. As should be appreciated the solid phase produce stream 122 which is formed as a result of this separation, passes, thereover, the liquid collection channel 143, and then enters the produce delivery channel 123 for movement to the inspection zone 124. At this location in the invention, 10, the liquid phase produce stream 121 is transported in a second path of travel, and in a direction substantially downwardly, and opposite to that of the produce stream's 11 direction of movement or first path of travel, and which is induced by combined effects of both the vibratory energy and the influence of gravity imparted to the product transporting tray 100 by the action at least in part of the respective energized vibratory motors 94. In another possible alternative embodiment, a collection pan may be located beneath the vibratory tray, and may collect juice and direct it towards the discharge end of the vibratory tray. This movement of the liquid phase produce stream 121, as illustrated, is substantially tangential relative to the earlier described gravity induced substantially vertically downwardly directed movement of the solid phase produce stream 121 which passes through the passageway 132, and which is defined by the produce delivery channel, 123.

The liquid phase capture and retention assembly 140 further includes, as one feature, the backwardly inclined product separation surface 120, (FIG. 5A) and which has a first, proximal or liquid intake or receiving end 144, and a second, distal or liquid discharge end 145. The backwardly inclined product separation surface further has a first, inferior, or bottom surface 150, and a second, superior or top surface 151. Further, and positioned immediately downstream relative to the liquid discharge end 145 is a downwardly angulated ramp 152 which receives the liquid phase produce stream 121 from the backwardly inclined product separation surface 120, and which directs the liquid phase produce stream 121 onto the angulated top surface or platform 30 and which is further mounted on the supporting legs 20. As can be appreciated from a study of FIG. 2, the top surface 30 is operable to support, direct and transport the liquid phase produce stream 121, at least in part, to the second discharge end 142 of the liquid phase capture and retention assembly 140. As earlier discussed, the top surface 30 is concavely shaped, and this feature facilitates the channeling of the liquid phase produce stream 121 in the appropriate direction. The backwardly inclined product separation surface 120 is adjustably borne by the vertical panel or plate 130, and affixed thereto by means well known in the art. The backwardly inclined product separation surface may be eliminated when the present invention is sorting substantially dry products such as nuts and the like.

The top surface 30, as earlier described, has a proximal, first or liquid receiving end 31, and a distal, second or liquid discharge end 32. The concavely shaped top surface 30 has an inferior, or bottom surface 153, and a superior, or upwardly facing surface 154. The upwardly facing surface 154 consists of two oppositely positioned, angularly, upwardly inclined sidewalls 155 which facilitate the movement of the liquid phase produce stream 121 in a direction of travel towards, and into, a central channel region 156. (FIG. 6) The distal, second end 32 is juxtaposed in gravity delivering relation relative to a liquid drain region 160, and which is formed in the top surface 30. In this regard, the liquid drain region 160 has formed therein a multiplicity of substantially small, circular apertures 161 which extend therethrough the first or bottom surface 153, and the second, or upwardly facing surface 154. The multiplicity of apertures 161 are effectively sized and shaped, so that, on the one hand, the respective apertures 161 retain on the top surface 30 unwanted solid harvesting debris 18, stems 16, leaves 17, and other unwanted solid material which may have become inadvertently mixed within the liquid phase produce stream 121; but on the other hand, allows the liquid phase produce stream 121 to drain downwardly therethrough under the influence of gravity. The top surface 30 is constructed or fabricated of stainless steel, steel, iron or other rigid metallic, or synthetic product or stock, and which can easily be cleaned and which further can be used with the liquid phase produce stream 121.

The liquid phase capture and retention assembly 140 is further comprised of a liquid collection container 162 which is oriented in gravity receiving relation relative to the liquid drain region 160. The liquid collection container 160 has a drain conduit 163 which is coupled in fluid flowing relation relative to a liquid phase delivery conduit 164, as can best be seen in FIG. 9.

The liquid phase delivery conduit 164 has a first, proximal or liquid receiving end 165, and a second, distal or liquid discharge end 166. The first end 165 is attached to the drain conduit 163, and the second end 166 is located so as to deliver the liquid 13 which is received in the liquid collection container to a collection container which receives acceptable produce which has passed through the inspection zone 124. This feature of the invention 10 will be discussed in greater detail, hereinafter.

The rigid T 167 (FIG. 9) provides a further means for coupling another apparatus or upstream device (not shown) and which collects juice or liquid from the produce, and allows the juice or liquid to be collected for further use.

The distal or discharge end 166 of the liquid phase delivery conduit 164 is moveable so as to allow the delivery of the liquid phase produce stream 121 to a desired storage container(s). The liquid phase delivery conduit 164 is constructed or fabricated of non-rigid PVC, plastic or other similar material or stock.

The present invention 10 includes an inspection zone 124 which is located substantially vertically downstream relative to the backwardly inclined product separation surface 120, and immediately below the distal end 126 of the produce delivery channel 123. As earlier noted, the produce stream 11 includes both unwanted solid material 12, and desirable and undesirable berries 14 and 15, respectively, and which pass, under the influence of gravity therethrough for visual inspection.

As can be seen in FIG. 2, the inspection zone 124 has a first or receiving end 171, and a second or discharge end. 172. The first or receiving end 171 of the inspection zone 124 is located immediately inferior to the proximal and distal generally vertically oriented panels 130 and 131, respectively. The inspection zone 124 is generally narrowly rectangular in shape, and is formed, at least in part, by some of the vertical support members 40, and the horizontal support members 35. The inspection zone 124 is bordered, at least in part, on the proximal boundary 173, by the imaging assembly window, and on the distal boundary 174, by an air manifold or ejector assembly. Both the imaging assembly window, and the air manifold, or ejector assembly will be discussed in greater detail, below.

The inspection zone 124 further includes, along the distal boundary 174, an ejector assembly 180. This well known device is comprised of a multiplicity of compressed air nozzles 181 which are borne by a frame 182, and moveably affixed thereto by means well known in the art. The multiplicity of compressed air nozzles 181 are located therebetween the first or receiving end 171, and the second or discharge end 172 of the inspection station 124. As shown by reference to FIG. 2, the multiplicity of compressed air nozzles 181 are mounted at an acute angle relative to the gravity induced substantially vertical path of travel of the solid phase product stream 122. The multiplicity of compressed air nozzles 181 are coupled with a source of compressed air, not shown. The multiplicity of compressed air nozzles 181 are operationally coupled with the imaging device, and controller which are discussed, hereinafter. The ejector assembly 180, and the multiplicity of compressed air nozzles 181 are each located laterally, outwardly, relative to the inspection zone 124, and are further operable to remove unwanted solid phase material 12, and selective produce material, such as undesirable stems, unripe berries, insects, leaf, and foreign material 15 from the solid phase produce stream. The undesirable berries 15 which are removed have botanical, or other characteristics which have been predetermined, in advance, to not be wanted in a resulting desired produce stream.

Located downstream of the inspection zone 124, is a pyramidal, product diversion plate 190, and which is located immediately inferior to the second or discharge end 172. The pyramidal product diversion plate 190 assists in separating a resulting, desired solid phase produce stream 191, and an unwanted or undesirable solid phase produce stream 192. The resulting desired solid phase produce stream 191, which includes berries 14 having predetermined, desirable characteristics, is directed by the laterally outwardly facing surface 193 of the pyramidal product diversion plate 190, to a desired product container 194, for collection and use. On the other hand, the undesired solid phase produce stream 192 is directed by the ejector assembly 180, and more specifically by the blast of compressed air from one or a multiplicity of compressed air nozzles 181, to the laterally inwardly oriented surface 195 of the pyramidal product diversion plate 190 where they travel to a downwardly inclined discharge ramp or channel 196, and are then received in a discard container 197 to be removed for appropriate disposal. In one possible form of the invention 10 the discharge ramp 196 is operable to collect any liquid material 13 moving with, or derived, at least in part from, the rejected produce moving in the undesirable produce stream 192, and recycle or return that same liquid material 13 to the desired produce container, 194. In another possible form of the invention 10, the rejected produce received in the discard container 197 is returned for further processing in an attempt to further separate unwanted solid material such as stems 16, and the like, from desirable berries 14. In another possible form of the invention 10, not shown in the drawings, the product diversion plate 190 is designed in the form of a right triangle, and wherein the resulting solid phase produce stream 191, which includes berries 14 having predetermined characteristics are permitted to pass by the right angle product diversion plate 190 to a desired product container 194. Alternatively, the undesired resulting solid phase produce stream 192 is directed by the ejector assembly 180, and more specifically by the blast of compressed air from one of the multiplicity of compressed air nozzles 181 to the laterally inwardly angularly oriented surface 195 of the right angle product diversion plate 190 where they travel to a downwardly inclined discharge ramp or channel 196, and are then received in a discard container 197 so as to be later removed for appropriate disposal. In another possible embodiment of the product diversion plate 190, the plate is designed as an upwardly extending angularly oriented plate, and wherein the resulting solid phase produce stream 191, which includes berries 14 having predetermined characteristics are permitted to pass by the upwardly extending angularly oriented product diversion plate 190 to a desired product container 194. Alternatively, the undesired resulting solid phase produce stream 192 is directed by the ejector assembly 180, and more specifically by the blast of compressed air from one of the multiplicity of compressed air nozzles 181, to the laterally inwardly angularly oriented surface 195 of the upwardly extending angularly oriented product diversion plate 190 where they travel to a downwardly inclined discharge ramp or channel 196, and are then received in a discard container 197 to be later removed for appropriate disposal.

The discharge channel 196 is substantially rectangular and has a first, top or superior surface 200, and a second, bottom or inferior surface 201. The discharge channel 196 has a substantially vertical end wall 202. The discharge channel 196 is substantially open along the laterally outwardly directed face 203, and is thereby oriented in receiving relation relative to the ejector assembly 180 when it is energized or pulsed. The undesired or unwanted solid phase produce stream 192 is typically manually removed at the distal aperture 204, as shown in FIG. 1. The undesired or unwanted solid phase produce stream 192 moves through the discharge channel 196 and in a direction which is substantially perpendicular relative to that of product stream 11 which is moving along the product transporting tray 100. The discharge channel 192 is constructed, or fabricated of stainless steel, steel, iron or similar rigid metallic or synthetic product or stock and which can be easily cleaned, and can further be used with the produce stream 11. As noted above, the undesired or unwanted solid phase produce stream 192 is collected in a discard container, 197, as shown in FIG. 1. The discharge channel or chute can be replaced by a number of other collection methods such as by a flume, auger, belt conveyor, or small container, not shown.

Referring now to FIG. 2, the present invention 10 includes an imaging device which is generally designated by then numeral 220, and which is employed for visually inspecting the solid phase produce stream 122 as it passes through the downstream inspection zone 124. Further, the invention 10 includes an illuminating device 240, which when energized, emits electromagnetic radiation 241 which is directed towards, and reflected from, the solid phase produce stream 122 which is passing through the inspection zone 124. The reflected electromagnetic radiation is directed, at least in part, back in the direction of the imaging device 220, and which subsequently forms an electrical signal which is representative of a captured image of the solid phase produce stream 122 which is passing through the inspection station 124.

The imaging device 220 is located immediately inferior to the top surface 30 of the present invention 10, and is borne by the frame 80, and adjustably affixed thereto by the earlier described mounting bracket 83. The imaging device 220 is housed completely within the second internal cavity 65. The imaging device is here depicted as a camera which, when rendered operable, forms an image of the solid phase produce stream 122 which is passing through the inspection zone. The imaging device or camera 220, has a line of sight 221, which bisects the inspection zone 124, non-perpendicularly, and further forms an acute angle relative to the path of travel of the solid phase produce stream 122. The camera, which is depicted, is of a type well known in the art.

The present invention 10 further includes an illuminating assembly 240 which is borne by the frame 80, and further affixed thereto by means of the mounting bracket 82. The illuminating assembly 240 is located inferior to the top surface 30; within the second internal cavity, 65; and is located laterally outwardly relative to the line of sight 221 of the camera or imaging device 220. The illumination or illuminating assembly 240, as illustrated, is comprised of two illumination units or bars which are individually located in a superior and inferior relationship, one relative to the other, and on opposite sides of the line of sight 221, and which, when energized, generates electromagnetic radiation 241 which is directed toward the solid phase produce stream 122 passing through the inspection zone 124. The electromagnetic radiation 241, which is generated by the illumination device 240, travels in a path which is substantially diverging relative to the line of sight 221 of the camera, or imaging device 220. When energized, the illuminating device 240 emits electromagnetic radiation 241 which is selected from the group which includes visible, near infrared, infrared and ultraviolet light. Still further, and in one possible form of the invention 10, the illuminating device, 240, when energized, emits electromagnetic radiation 241 which is modulated or strobed, at least in part. Moreover, and in still another form of the invention, 10, the illuminating device 240 emits electromagnetic radiation 241 which may, at least in part, be polarized.

The present invention 10 includes a substantially transparent window 250 which is located forwardly of, and along the line of sight 221 of the camera, or imaging device 220. The transparent window 250 is borne by the frame 80, and affixed thereto by means well known in the art. The transparent window 250 is located below the top surface 30, and positioned in the second cavity 65 which is defined by the frame 80. The transparent window 80 is mounted on the frame 80, and positioned substantially perpendicularly relative to the line of sight 221 of the imaging device 220. This is best understood by a study of FIG. 2. The substantially transparent window operates so as allow the passage of the emitted electromagnetic radiation 241 to the inspection zone 124, and further allows the reflected electromagnetic radiation returning from the inspection zone to pass, therethrough, and be received by the imaging device 220, and which then forms an electrical signal representative of the image of the solid phase produce stream 122 which is passing through the inspection zone 124. In one possible form of the invention 10, an assembly for cleaning 260 is provided and which is operable to periodically clean the transparent window 250 so as to remove any particulate matter which might be deposited thereon, and which may have come from the inspection station 124, or from the immediate ambient environment. The transparent window 250 operates to prevent debris, or other particulate matter which may come from the ambient environment or from the solid phase produce stream from being deposited on either the imaging device 220 or the illuminating device 240.

The present invention 10 further includes an optical background surface 270 which is located within the inspection zone 124, and positioned laterally outwardly relative to the solid phase produce stream 122. As seen in the drawings this optical background surface is located superior to the ejection assembly 180. The background surface 270 is further oriented along the line of sight 221 of the imaging device 220, and additionally is illuminated by the electromagnetic radiation 241 which is generated or emitted by the illuminating device 240 when it is energized. The optical background surface 270 may comprise a static, visually reflective background which is operable to enhance the reflection of the electromagnetic radiation 241 from the solid phase produce stream 122, and allow a better image to be captured by the imaging device 220. Still further the optical background could comprise a non-reflective, or only minimally reflective optical background. Moreover, the optical background 270 could comprise an optically active background. These respective optical backgrounds would be selected based upon the nature of the solid phase produce stream 122 which is being inspected and sorted by the invention 10.

The present invention 10 further includes a controller 280; a UPS (Uninterruptible Power Supply), 290; a power distribution panel, 300; an air conditioning unit 310; and a user interface or control station 320 for controlling the operation of the invention 10. In the present arrangement the controller 280 is controllably coupled to the conveyor 90; imaging device 220; illuminating device 240; and the ejector assembly 180. Further the user interface 320 is mounted on the frame 80, and is operably coupled with the controller 280. The power distribution panel 300 is coupled to an outside source of electricity (not shown), and which is further coupled in an electrical distributing relationship relative to the subassemblies previously described, and which are energized by electricity. The UPS 290 is provided to ensure that upon the loss of electrical power from the power distribution panel, 300, that the controller 280 remains energized so as to prevent any damage or loss of data from same. As seen in FIG. 2 the UPS, 290, controller 280 and power distribution panel 300 are borne by the frame 80, and located within the second cavity 65 thereof. The air conditioning unit 310 is utilized to provide cooling air to the second cavity 65 so as to maintain the controller 280, and the other assemblies in the second cavity 65, at an acceptable operational temperature, and to further dissipate the heat energy which is generated by the energizing of the illumination device 240, and the controller, or which may come about as a result of using the invention 10 in a remote, non-factory or uncontrolled ambient environment such as in a harvesting area, not shown, and where the ambient or daily air temperatures during a harvesting season could easily rise to a level in excess of 100 degrees F. or higher. The, UPS and power distribution panels are of a type which are well known in the art.

As earlier noted, the imaging device 220 is operable to form an electrical signal which is representative of the image of the solid phase produce stream 122 which is passing through the inspection zone 124, and which has been illuminated by the illuminating device or assembly 240. This electrical signal, which is representative of this captured image formed by the imaging device 220, is provided to the controller 280. The controller 280 receives this electrical signal, and based upon input data supplied from the control station 320, and stored in an internal memory, not shown, determines if the solid phase produce stream 122 includes unwanted solid material 12, or further if undesirable berries 15 are present. Once these unwanted solid material 12, or undesirable berries 15 are identified, the controller 280 sends a control signal to the ejector assembly 180. The ejector assembly then releases a source of compressed air to one of the plurality of compressed air nozzles 181 and which is effective in forcing the unwanted solid material 12 or undesirable berry 15 out of the solid phase produce stream 122, and into the undesirable produce stream 192. Other desirable produce 14 pass through the inspection zone 124, and are collected for subsequent processing as earlier described. As can be understood, therefore, the present invention 10 provides a convenient means whereby the unwanted or undesirable solid phase produce passes through the inspection zone 124, and the ejector assembly 180 is rendered operable to remove unwanted or undesirable solid phase produce having predetermined undesirable qualities, so as to create a resulting substantially desirable produce stream 191.

Second Form

Figure 11:
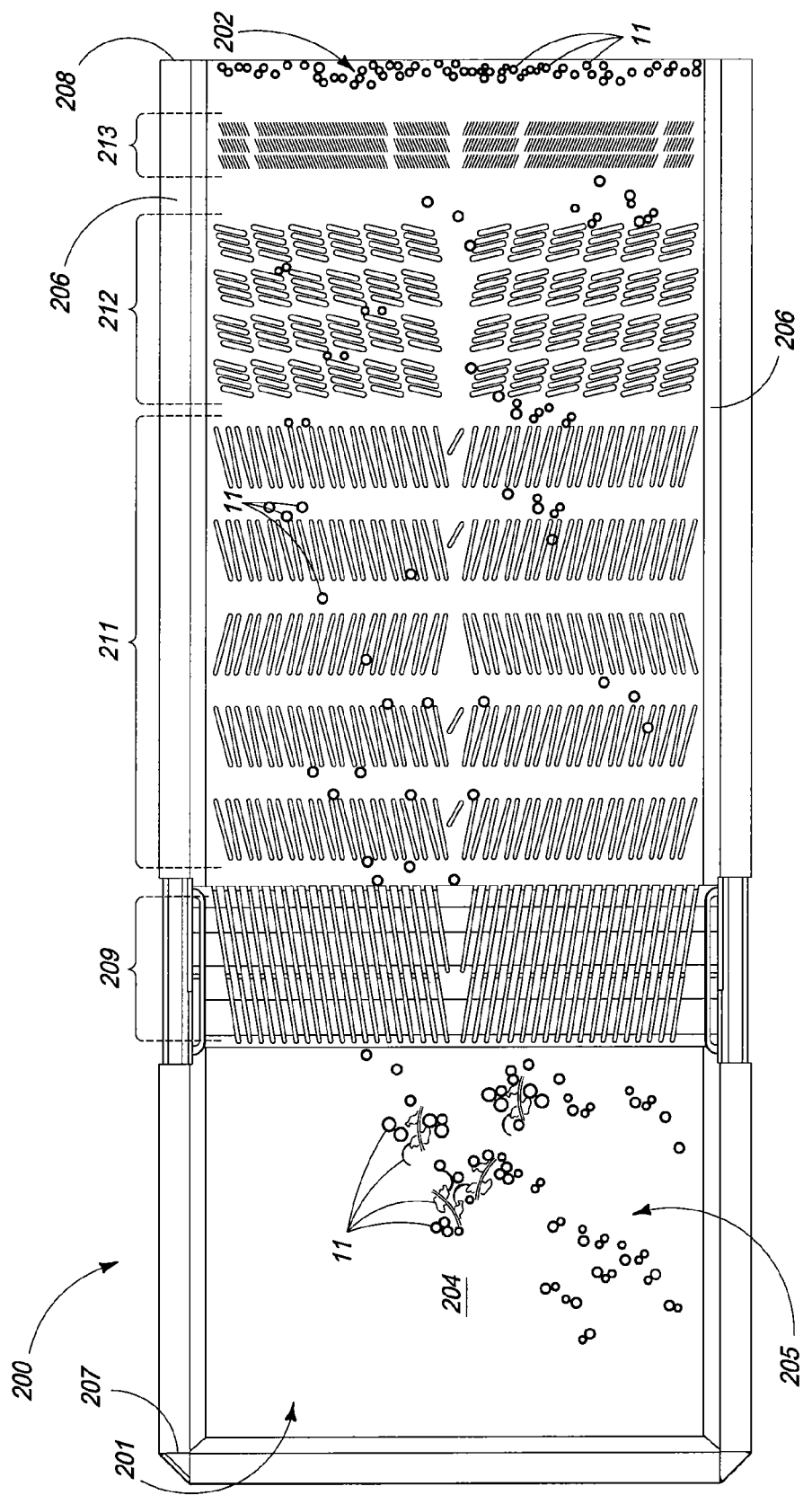
FIG. 11 is a top, plan view of a feature of the present invention.

Referring to FIG. 11 and following, a second form of the present invention is illustrated. As should be understood, the second form of the invention, is also useful for sorting berries and similar products, and further has improved conveying surface.

Figure 12:
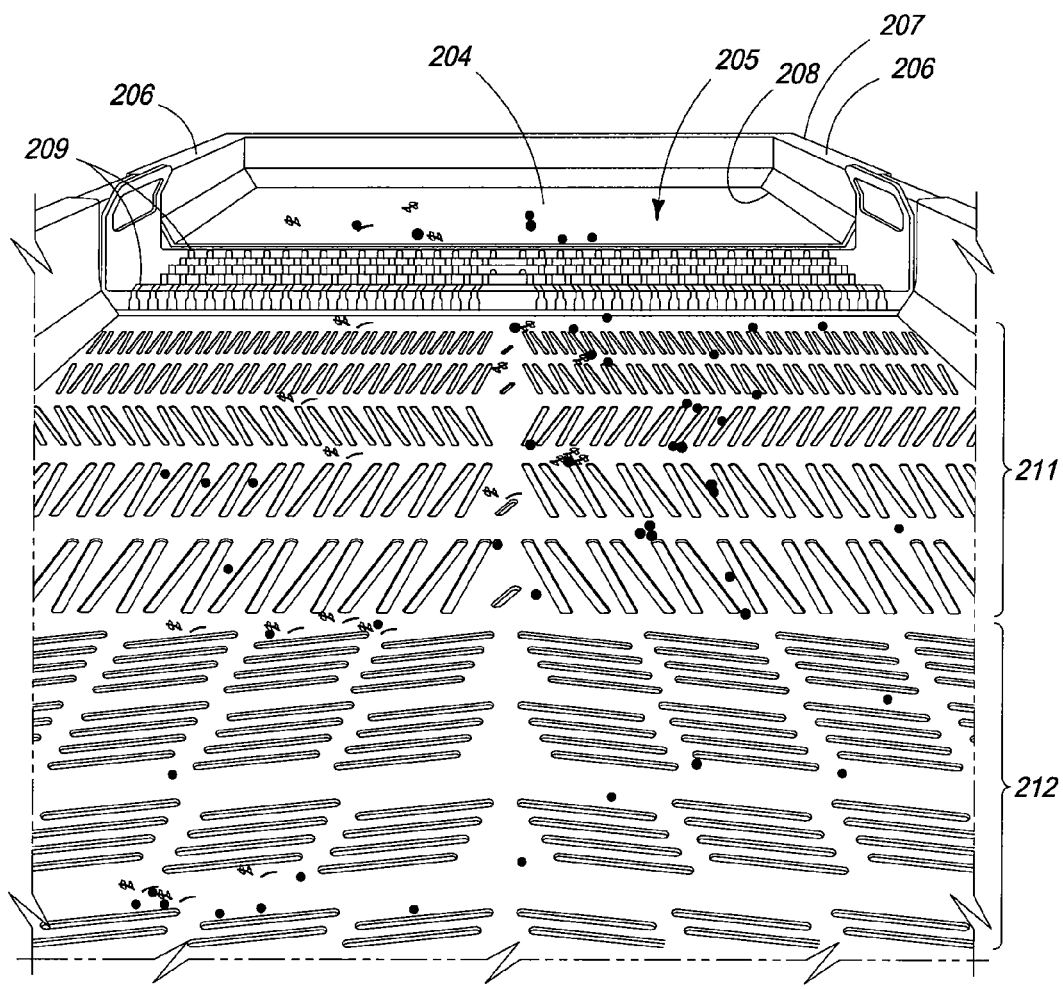
FIG. 12 is a greatly enlarged, fragmentary, angulated, perspective view of the product conveying surface which forms a feature of the present invention.
Figure 13:
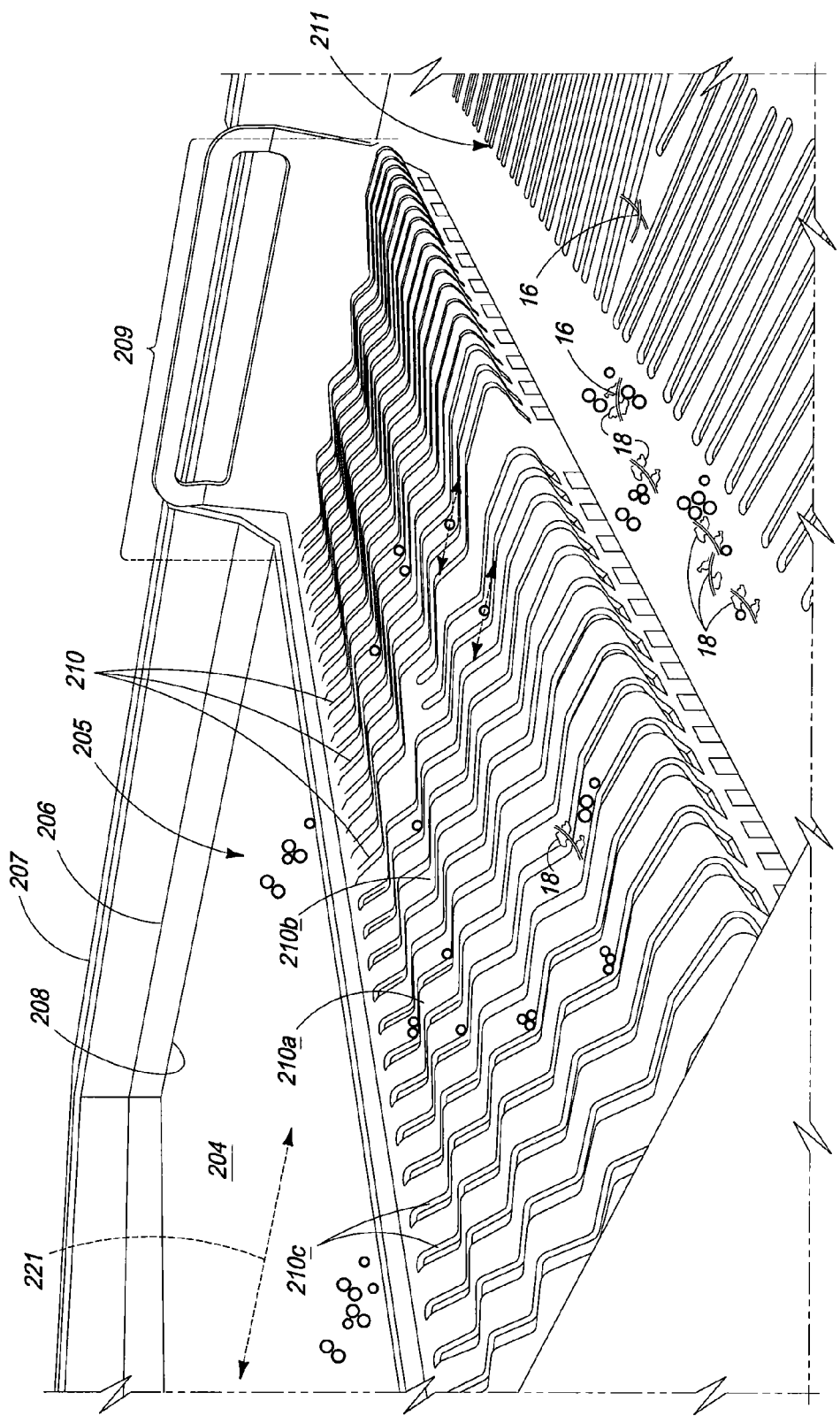
FIG. 13 is a greatly enlarged, fragmentary, side elevation view of the first region of the product conveying surface, and which illustrates the parallel ridges and troughs which form a portion of, same.
Figure 14:
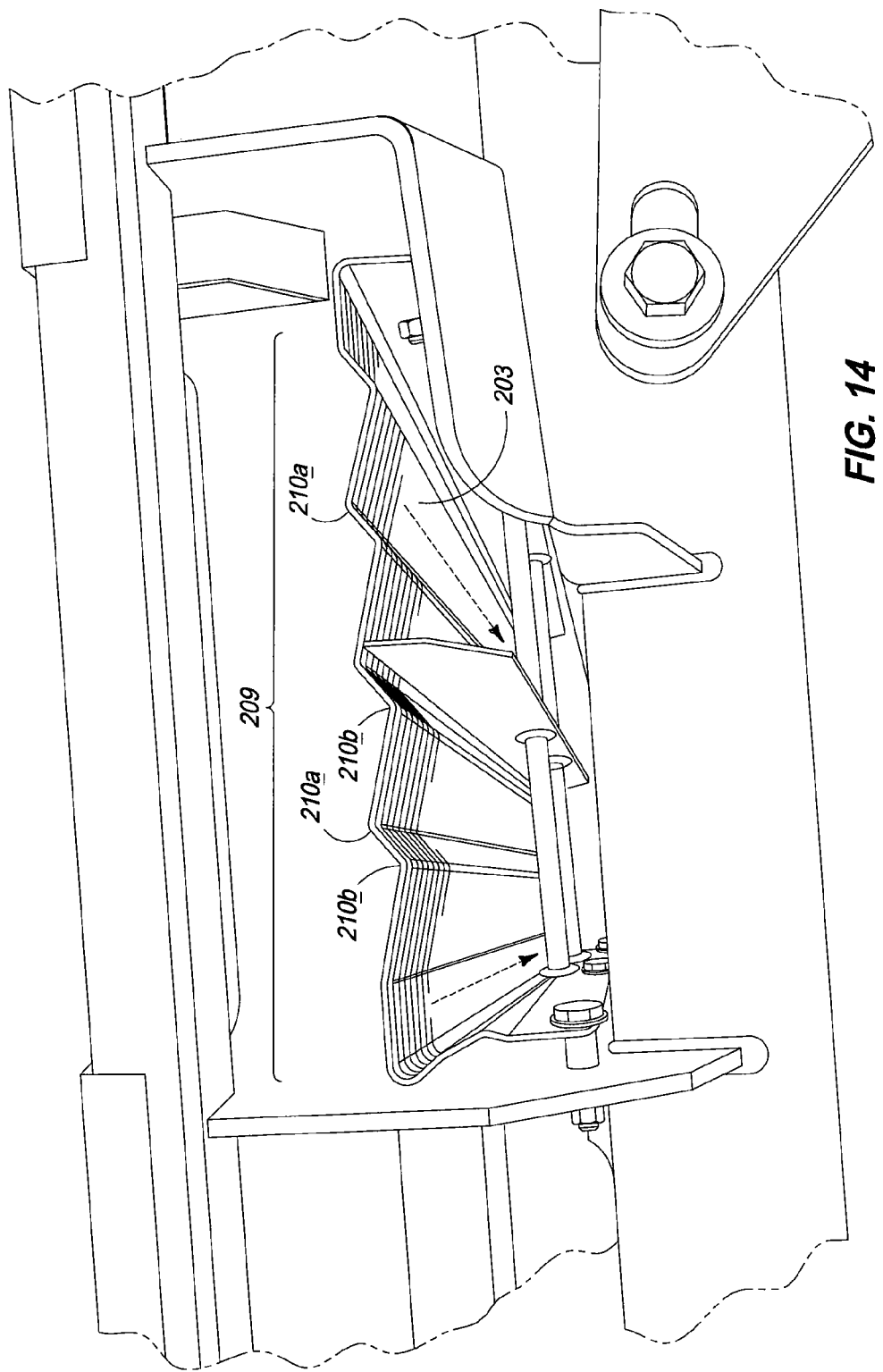
FIG. 14 is a fragmentary, side elevation view of the bottom surface of the parallel ridges and troughs employed on the conveying surface of the present invention, and which were previously illustrated in FIG. 13.

The second embodiment of the present invention has many of the features as earlier discussed. However, its principal feature pertains to a vibratory product pan, tray or conveying surface, and which is generally indicated by the numeral 200 as seen in FIGS. 11, 12 and 13, respectively. In the second form of invention, the vibratory conveying surface 200 is spaced in a predetermined, angularly inclined orientation relative to the top surface 30 as earlier discussed. Further, the vibratory conveying surface 200 is held in this predetermined orientation by the individual mounting brackets 50 as earlier described. The vibratory product or conveying surface also has a supporting frame or chassis 91 which is fastened to the respective mounting brackets 50. The frame has a first end 92, and a second end 93. The frame 91 is spaced from, and located above the underlying top surface 30 as earlier discussed. Mounted on the first end 92 of this form of the vibratory conveyor 200 is a pair of electrically energizeable and moveably adjustable vibratory motors, which are indicated by the numeral 94, as can be best seen in FIG. 15. The angle of energy transfer between the vibratory motors 94 and the frame 91, and which is commonly referred to as the stroke angle 220 (FIG. 15), is adjustable in both a horizontal and vertical direction so as to facilitate at least, on the one hand, the aggressive bouncing of a product stream 11, on the first end 201 and further cause the individual product forming the product stream 11 to spread out and separate across the width dimension of the conveying surface 200 at the first or proximal end 201 of the vibratory conveyor 200, on the other hand the adjustment of the stroke angle 220 substantially minimizes bouncing, and product spreading, while inducing more product separation or shear, of the product stream 11 at the second or distal end 202 of the vibratory conveyor 200. Further, and attached near the first and second ends, 92 and 93, of the frame 91 are opposite pairs of resilient, biasing spring members or vibratory isolators or members 95. In the presently shown arrangement, vibratory energy which is generated in the moveably adjustable vibratory motors 94 is transmitted to the overhead product transporting tray, pan or conveying surface, which is generally indicated by the numeral 200. The vibration isolators 95 isolate greater than about 97% of the vibratory energy found at the top of the vibration isolators 95 from the bottom of the vibration isolators 95 and substantially prevents the generated vibratory energy from being transmitted to, or entering the remainder of the present invention 10 through the vertical members 20 and 40 respectively. This generated vibratory energy, in combination with the effects of gravity, causes the produce stream 11 to move at a predetermined speed, which is variable when this product speed is measured between the proximal and distal ends 201, and 202 respectively. In the present arrangement the respective vibratory motors 94 are moveably adjustable so as to cause the speed of the produce stream 11 to be reduced to a minimum before the produce stream 11 leaves the product conveying surface 200, as will be discussed in greater detail, below. The individual produce forming the produce stream 11 moves along a non-linear path of travel which extends between the first and second ends, 201 and 202, respectively, of the product conveying surface 200

As earlier noted, the product transporting tray or conveying surface 200 (FIG. 11) has a first, proximal or produce receiving end 201, and a second, distal or produce discharge end 202. Further, the product transporting tray or conveying surface has an inferior or bottom surface 203, as best seen in FIG. 15, and a superior or top surface 204, as best seen in FIG. 11. As can be appreciated from a study of FIGS. 11 through 15, the superior or top surface 204 is operable to support and transport the produce stream 11 to be sorted for movement at a given speed and along a first path of travel from the first, proximal or produce receiving end 201 to the second, distal or produce discharge end 203 thereof. The top or superior surface 204 is formed in a manner to define a channel region 205 of a given width. The product transporting tray or conveying surface 200 is further comprised of a pair of spaced, substantially vertical sidewalls 206, which extend generally, vertically upwardly from the superior or top surface 204. Each of the vertical sidewalls has a first, or proximal end 207, which is located adjacent to the superior or top surface 204 of the product transporting tray or conveying surface 200 and a second or distal end 208, which is similarly located adjacent to the superior or top surface 204 of the product transporting tray or conveying surface 200. The product transporting tray or conveying surface 200 is fabricated or constructed from stainless steel, steel, iron, aluminum or other rigid metallic product or stock which is easily cleaned and can be used with the produce stream 11.

The top or superior surface 204 of the product transporting tray or conveying surface 200, as depicted in FIGS. 12 and 13 is generally non-planar, and supports the produce stream 11 for non-linear movement between the first, proximal or produce receiving end 201, and the second, distal or produce discharge end 202. Located in a position adjacent to the first, proximal or produce receiving end 201 is a first region 209, which is defined by a multiplicity of substantially parallel ridges and troughs 210 (*a*) and (*b*), (FIG. 13) each having a predetermined height, length and width dimension, and which are further oriented substantially parallel relative to the product transporting tray or conveying surface 200, and spaced across the width dimension of the product transporting tray or conveying surface 200, as can best be seen in FIG. 13 or 14 respectively. The multiplicity of substantially parallel ridges and troughs 210 (*a*) and (*b*) each have openings of a given dimension and which extend through the surfaces 203 and 204, respectively. The first region 209 that is defined by the multiplicity of substantially parallel ridges and troughs 210 induces or causes the produce stream 11 which is passing, thereover, to roll backwards and forwards, under the influence of the vibratory motion 221, as can best be seen in FIG. 13, and which is imparted to the product transporting tray or conveying surface 200, by the vibratory motors 94 so as to cause the produce stream 11 to singulate into individual produce, and to separate from undesirable, non-produce related objects 18, which may include stems 16 and leaves 17, which are adhering to the individual produce and which forms as part of the produce stream 11 which is deposited on the first end 201.

The top or superior surface 204 of the product transporting tray or conveying surface 200 is further defined by a second region which chiefly has substantially elongated converging and diverging apertures 211 formed therein, and which are spaced across the width dimension of the product transporting tray or conveying surface 200. These apertures 211 are further located downstream from, and adjacent to the first region 209 which is defined by the substantially parallel ridges and troughs 210 (*a*) and (*b*), as can be best seen in FIGS. 11 and 12 respectively. The multiplicity of substantially elongated converging and diverging apertures 211 extend through the surfaces 203 and 204 respectively. Moreover, the substantially elongated converging and diverging apertures 211 may have variable width and length dimensions as well as overall shapes. For example, the cross sectional dimension of the respective apertures 211 may increase in size as those dimensions are measured along a line which extends between the proximal receiving end 201 of the product transporting tray or conveying surface 200, and the distal or discharge end 202 thereof. The respective substantially elongated converging and diverging apertures 211 are provided and operate so as to eliminate, at least in part, undesirable non-produce related debris 18, and other unwanted material which may be incorporated, mixed or entrained within the produce stream 11. Additionally this feature further causes or induces the produce stream 11 to further singulate and separate, one from another, and become somewhat more evenly distributed across the width dimension of the product transporting tray or conveying surface 200 so as to form a single layer of produce. This action of the produce stream (spread out and singulate) permits the aforementioned unwanted or undesirable non-produce materials 18 to pass therethrough the conveying surface 200, under the influence of gravity and fall for collection upon the top surface 30. This separation action further has the effect of causing the produce stream 11 to become increasingly more uniform, and desirable, as the produce stream 11 moves from the proximal or produce intake end 201, to the distal or produce discharge end 202. Moreover, and by studying the drawings it will be understood that the substantially elongated converging and diverging apertures 211 cause the individual produce making up the produce stream 11 to move in a non-linear fashion down the length dimension of the product transporting tray or conveying surface 200 between the proximal or produce intake end 201, and the distal or produce discharge end 202, respectively. In particular, the substantially elongated converging and diverging apertures 211 cause the respective articles of produce making up the produce stream 11 to increasingly roll and tumble from side-to-side. This movement of the individual produce has the effect of dislodging undesirable, non-produce related materials 18 which may be clinging to the individual produce articles, and is further effective in breaking up clusters of produce which may be clinging or adhering together. Moreover, this non-linear movement causes the produce stream 11 to increasingly spread out across the width dimension of the product transporting tray or conveying surface 200 so as to cause the produce stream 11 to become only a single produce item thick, for example, by the time the produce stream 11 reaches the distal or produce discharge end 202 of the product transporting tray or conveying surface 200. The substantially elongated converging or diverging apertures 211 are further designed to permit the liquid component 13 of the produce stream 11 to move gravitationally downwardly from the product transporting tray or conveying surface 200 for subsequent collection and use, as described, previously.

The top or superior surface 204 of the product transporting tray or conveying surface 200 further includes a third region defined by substantially elongated transverse apertures 212, and which are best seen in FIGS. 11 and 12. The region of the substantially elongated transverse apertures 212 are spaced across the width dimension of the product transporting tray or conveying surface 200, and are further located downstream from, and adjacent to, the second region having the substantially elongated converging and diverging apertures 211. The substantially elongated, transverse apertures 212 extend through the surfaces 203 and 204, respectively. The substantially elongated and transverse apertures 212 have a predetermined length and width dimension. The substantially elongated transverse apertures 212 are provided to substantially reduce, at least in part, the horizontal and vertical components of motion of the produce stream 11 such that the produce stream 11 has substantially reduced horizontal and vertical components of motion upon reaching the distal or produce discharge end 202, of the product transporting tray or conveying surface 200. Upon reaching the distal or discharge end 202. the individual produce forming the produce stream 11 falls substantially, uniformly, immediately, vertically downwardly. The substantially elongated and transverse apertures 212 are further arranged so as to permit the liquid component 13 of the produce stream 11 to move gravitationally, downwardly, from the product transporting tray or conveying surface 200 for collection and subsequent use, as previously described.

The top or superior surface 204 of the product transporting tray or conveying surface 200 is further defined by a fourth region that includes predominantly transverse slots 213 which are located immediately downstream, and adjacent to the region of substantially transverse apertures 212, and immediately upstream, and adjacent to the distal or produce discharge end 202 of the product transporting tray or conveying surface 200 (FIG. 11). The predominantly transverse slots extend through the surfaces 203 and 204 respectively. The predominantly transverse slots 213 have a predetermined width and length dimension. The predominantly transverse slots 213 are provided so as to further at least in part, substantially reduce or otherwise minimize the horizontal and vertical components of motion of the produce stream 11 such that the produce stream 11 has a substantially reduced vertical and horizontal component of motion upon reaching the distal or produce discharge end 202 of the product transporting tray or conveying surface 200. The predominantly transverse slots 213 are further operable to permit any remaining liquid component 17 of the produce stream 11 to move gravitationally, downwardly from the product transporting tray or conveying surface 200 for collection and subsequent use, as previously described.

Operation

The operation of the described embodiments of the present invention are believed to be readily apparent, and are briefly summarized at this point.

Referring now to the drawings, the present invention 10, which comprises a sorting apparatus which finds particular usefulness in sorting a stream of produce 11, and which may include berries and the like, is best depicted in FIG. 1. This view shows the present invention 10 as it might be configured when employed either in a factory, or in the alternative, in a remote environment such as a harvesting area; crush pad at a winery; or the like (not shown). As seen in FIG. 1, the present invention 10 is located downstream relative to several previous, prior art devices which have been used in the past for processing produce. The upstream produce processing portion 350 includes a first conveyor 351 upon which, picked produce such as bunches of previously harvested grapes, are deposited. These grapes may be deposited from a harvesting bin which is lifted to a location where it can then be dumped or deposited onto the first conveyor 351. The first conveyor 351 is operable to carry this produce (grapes), to the distal end thereof, and where it is thereafter, delivered into a de-stemming apparatus which is generally indicated by the numeral 352. These de-stemming devices are well known in the art and are operable, through a rotary rotating screw (not shown), to separate the produce, that is the berries, from the attached stems, and to take the stem's debris, leaves, and the like, and discharge it through the discharge end 353 where it is collected for disposal. The separated produce, in this instance grapes, may still include, as earlier noted, harvesting debris of various types including leaves, portions of stems, and other harvesting related debris which is then moved onto a second conveyor 354. The second conveyor 354 carries this produce including assorted unwanted solid material such as harvesting related debris 12 as earlier discussed, to the proximal end 91 of the conveyor 90 of the present invention.

In its broadest aspect, the sorting apparatus 10 of the present invention includes a conveyor 90 having a distal end 93, and which transports a produce stream 11/121 at a predetermined speed along a first path of travel to the distal end 93 thereof. The produce stream 11 includes unwanted solid materials 12, and a desired liquid 13, which is derived, at least in part, from the produce in the produce stream 11/121. In the arrangement as shown in the drawings, a product separation surface 120 is mounted in spaced relation relative to the distal end 93 of the conveyor 90. The produce stream 11, including the unwanted solid material 12, passes thereover, and are frictionally slowed to a speed such that the resulting produce stream 122 falls substantially immediately, vertically, downwardly therefrom. The liquid 13, in the produce stream 11, is separated from the produce stream 11 by the product separation surface 120, and travels gravitationally, downwardly along a liquid pathway 121 which moves in a second path of travel. An inspection zone 124 is located downstream relative to the product separation surface 120. The produce stream 122, including the unwanted solid material 12, passes therethrough for visual inspection. An imaging device 220 is provided for visually inspecting the produce stream 122 which is passing through the inspection zone 124. An illuminating, or illumination device 240 is provided for illuminating the produce stream 121 passing through the inspection zone 124. Further, an ejector assembly 180 is provided and which is located downstream of the inspection zone 124, and which removes the unwanted solid material 12, and individual produce 14 in the produce stream having undesirable characteristics.

Another aspect of the present invention relates to a sorting apparatus 10 which includes a conveyor 90 for transporting the produce stream 11 along a first course of travel for sorting. The produce stream 11 includes unwanted solid materials 12, and a desired liquid 13 which is derived from the produce. The conveyor 90 has a first intake end 92, and a second discharge end 93. The conveyor 90 further accelerates the produce stream 11 to a given speed at the first intake end 92, and reduces the produce stream 11 speed at the distal end 93 thereof. A product separation surface 120 is provided and forms, at least in part, a liquid collection channel 143, which is mounted in spaced, downstream produce flowing relation relative to the second discharge and 93 of the conveyor 90. The liquid 13 which is mixed with the produce stream 11, moves, under the influence of gravity, into the liquid collection channel 143. The produce stream 11 further includes unwanted solid material 12 which typically passes over the liquid collection channel 143. The produce separation surface 120 frictionally engages the produce stream 11, including the unwanted solid material 12, so as to substantially reduce the speed of movement of the produce stream 11 such that the produce stream 11 including the unwanted solid material 12, falls substantially vertically downwardly along a pathway 132 after the produce stream 11 passes over the liquid collection channel 143. An inspection zone 124 is located substantially vertically downwardly relative to the product separation surface 120, and along the pathway 132. The produce stream 122, including the unwanted solid material 12 are visually imaged and inspected in the inspection zone 124. An ejector assembly 180 is provided and which is further positioned downwardly, and laterally outwardly relative to the inspection zone 124. The ejector assembly 180 is operable to remove the unwanted solid material 12, and selective individual produce, such as undesirable berries 15 within the produce stream 11 moving along the pathway 132, and which have predetermined undesirable qualities. A controller 280 is provided and which is operably coupled with a conveyor 90, inspection zone 124 and ejector assembly 180. The controller identifies the unwanted solid material 12, and the individual produce, such as undesirable berries 15, and the like, within the produce stream 122 in which you have predetermined undesirable qualities and which travel through the inspection zone 124. The controller 280 activates the ejector assembly 180 so as to remove from the produce stream 122, the unwanted solid material 12, and the individual produce having undesirable qualities 15. This action produces a resulting desired produce stream 191. The invention 10 further includes a liquid delivery assembly 140 which collects the liquid 13 from the liquid collection channel 143, and recombines the liquid 13 with the resulting desired produce stream 191.

In another embodiment of the present invention, the sorting apparatus 10 includes a conveyor 90 for transporting the produce stream 11 along a first course of travel for sorting. this first course of travel routes the produce stream 11 over a vibratory pan or surface 200. The vibratory pan or surface 200 has a top or superior non-planar conveying surface 204 and includes a first, proximal or intake end 201 and a second, distal or discharge end 202. The vibratory conveyor 200 further includes a first region 209 comprised of substantially parallel ridges and troughs, 210(*a*) and 210(*b*), respectively, and which is located adjacent to the first, proximal or intake end 201. The first region 209 of substantially parallel ridges and troughs 210(*a*), 210(*b*) induces the produces stream 11 to assume a backwards and forwards rolling or tumbling motion and assists in removing unwanted harvesting debris 18, such as twigs 16 and the like. Further, while the produce stream 11 passes over this first region 209, the desired liquid component 13 of the produce stream 11 is permitted to move gravitationally downwardly for collection and further processing. The top or superior surface 204 of the vibratory conveyor 200 has a second region comprised of a multiplicity of elongated converging and diverging apertures 211. As the produce stream 11 passes over this second region 211, the produce stream 11 is induced to segregate and individualize into a layer a single produce item high, in addition to further permitting unwanted harvest items 18 to pass therethrough for collection and proper disposal and desired liquid component 13 to pass therethrouh for collection and further processing. The conveying surface 200 has a third region defined by a multiplicity of elongated substantially transverse slots 212. This third region 212 further segregates the produce stream 11 into individual pieces of produce and removes undesired harvest items 18 and desired liquid component 13 from the produce stream 11. The conveying surface has a fourth region defined by a multiplicity of narrow, transverse slots 213. This region 213 further induces the produce stream 11 to segregate and individualize and assume a uniform nature prior to reaching the second, distal or discharge end 202 of the conveying surface 200. This fourth region 213 further aids in removing, gravitationally, any remaining unwanted debris 18 and desired liquid component 13 from the produce stream 11. As the produce stream 11 is introduced to the first, proximal or intake end 201 of the conveying surface 200, a pair of adjustable vibratory motors 94 imparts vibratory motion to the conveying surface 200 and the produce stream 11. As the produce stream 11 passes over the conveying surface and the first, second, third and fourth regions 209, 211, 212 and 213, respectively, the horizontal and vertical components of motion are substantially reduced such that the produce stream 11 has minimal horizontal and vertical components of motion upon reaching the second, distal or discharge end 202 of the conveying surface 200 and falls substantially, uniformly, vertically downwardly therefrom for further processing. the produce stream 11 is then further processed as described above.

Therefore, it will be seen that the present sorting apparatus provides many advantages over the prior art devices and other assemblies which have been utilized in the past to sort objects of interest, like a produce stream 11 as depicted in the drawings. The present sorting device 10, as illustrated is useful for sorting a produce stream including a source of berries in a manner not possible, heretofore. Further, the present device 10 is compact, and upright, and provides a small footprint, and is further lightweight, and can be rendered useful in remote harvesting environments thereby reducing the costs of harvesting to a minimum. Moreover, the present apparatus 10 is reliable, and provides a resulting desired produce stream 191 which may be readily processed into various end products in a manner, and at costs not possible, heretofore.

In compliance with the statute, the invention has been described in language more or less specific as to structural and methodical features. It is to be understood, however, that the invention is not limited to the specific features shown and described, so the means herein disclosed comprise preferred forms of putting the invention into effect. The invention is, therefore, claimed in any of its forms or modifications within the proper scope of the appended claims appropriately interpreted in accordance with the Doctrine of Equivalence.

We claim:

1. A sorting apparatus, comprising:
    a vibratory conveyor having a non-planar conveying surface which has a first, proximal receiving end, and a second, distal discharge end, and which supports individual produce forming a produce stream for non-linear movement between the first, intake end, and the second, discharge end;
    a first region of the non-planar conveying surface, and which is defined by a multiplicity of substantially parallel, spaced ridges, and troughs, and which is located adjacent to the first, receiving end;
    a second region of the non-planar conveying surface, and which is defined by a multiplicity of elongated converging and diverging apertures, each having a predetermined dimension, and which is located adjacent to the first region;
    a third region of the non-planar conveying surface, and which is defined by a multiplicity of elongated substantially transverse apertures, each having a predetermined dimension, and which are located adjacent to the second region and which further includes elongated converging and diverging apertures;
    a fourth region of the non-planar conveying surface, and which is defined by a multiplicity of transverse slots, each having a predetermined dimension, which are located downstream of the elongated substantially transverse apertures and upstream relative to the second, discharge end, and wherein the produce stream is delivered to the first, receiving end, and is thereafter distributed across the non-planar conveying surface as a source of vibratory motion is imparted by the vibratory conveyor to the non-planar conveying surface, and which causes the produce forming the produce stream to move along the non-planar conveying surface at a given speed and to form a single, uniform layer of produce, which are separated from each other, and wherein the vibratory motion imparted by the vibratory conveyor causes the produce stream which is delivered to the first, intake end, to have both a vertical and horizontal component of motion, and wherein the vertical and horizontal components of motion of the produce diminishes as the produce stream moves along the non-planar conveying surface such that the produce stream falls substantially, uniformly immediately, vertically, downwardly from the second, discharge end of the non-planar conveying surface of the vibratory conveyor.

2. A sorting apparatus as claimed in claim 1, and wherein the non-planar conveying surface has a length and width dimension, and wherein the non-planar conveying surface is further effective in reducing, in height, the produce stream to a single layer of produce which are separated from each other, and which are spread out substantially across the width dimension of the product conveying surface, as the produce stream travels between the first and second ends, thereof.

3. A sorting apparatus as claimed in claim 1, and wherein the produce stream has both desirable and undesirable sized produce, and further includes a liquid component which is derived, at least in part, from the produce stream, and other undesirable objects, and wherein the second region which defines the elongated converging and diverging apertures has individual apertures which have predetermined dimensions, and wherein at least some undesirable sized produce, a portion of the liquid component, and at least some of the undesirable objects pass therethrough the individual apertures under the influence of gravity, and are eliminated from the produce stream, and wherein the produce stream has a weight which is reduced as the produce stream moves between the first intake end, and the second, discharge end of the product conveying surface.

4. A sorting apparatus as claimed in claim 1, and wherein the multiplicity of substantially parallel, spaced ridges and troughs as defined by the first region, each have a predetermined height, length, and width dimension, and which are further oriented substantially parallel relative to the non-planar conveying surface, and wherein the substantially parallel spaced ridges and troughs are spaced across the width dimension of the non-planar conveying surface, and wherein the first region further induces the produce stream passing thereover to roll forwards, and backwards, under the influence of the vibratory motion which is imparted to the non-planar conveying surface by the vibratory conveyor so as to cause the produce stream which is formed of individual produce to substantially singulate into individual produce, and to separate from undesirable, non-produce related objects which are adhering to the individual produce and which forms a portion of the produce stream.

5. A sorting apparatus as claimed in claim 4, and wherein the second region which defines the multiplicity of elongated converging and diverging apertures are spaced in a predetermined pattern, across the width dimension of the non-planar conveying surface, and are further located intermediate to the first and second ends of the non-planar conveying surface, and which further induces the produce stream to separate and be distributed along the width dimension of the non-planar conveying surface so as to form a single uniform layer of produce, and wherein the converging and diverging apertures permits the liquid component of the produce stream to move gravitationally downwardly from the non-planar conveying surface.

6. A sorting apparatus as claimed in claim 4, and wherein the second region which defines the multiplicity of elongated converging and diverging apertures is located downstream relative to the first region.

7. A sorting apparatus as claimed in claim 1, and wherein the third region which defines the multiplicity of substantially transverse apertures are spaced across the width dimension of the non-planar conveying surface and which operate to frictionally reduce a speed of the produce stream such that the reduced produce stream speed has a substantially diminished horizontal and vertical component of motion when the produce stream reaches the second, discharge end of the non-planar conveying surface, and thereafter falls substantially, uniformly, immediately, vertically downwardly from the second, discharge end of the non-planar conveying surface, and which further permits the liquid component of the produce stream to move gravitationally, downwardly from the non-planar conveying surface.

8. A sorting apparatus as claimed in claim 7, and wherein the third region which defines the multiplicity of substantially transverse apertures is located downstream of the second region which defines the multiplicity of elongated, converging and diverging apertures, and upstream relative to the fourth region which defines the substantially transverse slots.

9. A sorting apparatus a claimed in claim 1, and wherein the fourth region which defines the multiplicity of transverse slots, are individually spaced across the width dimension of the non-planar conveying surface, and which further frictionally engages the individual produce forming the produce stream such that the resulting produce stream speed has less of a horizontal component of motion upon reaching the second discharge end of the non-planar conveying surface, and thereafter the produce stream falls substantially, uniformly, immediately, vertically downwardly from the second, discharge end of the non-planar conveying surface, and wherein the multiplicity of transverse slots further permits the liquid component of the produce stream to move gravitationally, downwardly from the conveying surface.

10. A sorting apparatus as claimed in claim 9, and wherein the fourth region which defines the transverse slots is located downstream of, and adjacent to, the third region and which defines the substantially transverse apertures, and upstream of, and adjacent to, the second, produce discharge end of the non-planar conveying surface.

11. A sorting apparatus as claimed in claim 1, and wherein a vibratory motor is mounted on the vibratory conveyor and coupled in force transmitting relation relative to the non-planar conveying surface, and which, when energized, imparts the vibratory motion to the non-planar conveying surface, and wherein the vibratory motion of the non-planar conveying surface imparts to the individual produce forming the produce stream, and which is deposited at the first, intake end thereof, both the vertical and horizontal movement components, and which further imparts to the individual produce forming the produce stream which is located near the second, discharge end, a reduced vertical and horizontal movement component.

12. A sorting apparatus as claimed in claim 11, and wherein the vibratory motor, when energized, produces a vibratory force which is predominately oriented along a given, and variably adjustable stroke angle.

13. A sorting apparatus as claimed in claim 11, and further comprising:
an imaging assembly positioned downstream relative to the second discharge end of the non-planar conveying surface of the vibratory conveyor, and which produces a generated image of the produce stream which falls substantially downwardly relative to the second, discharge end;
a controller operably coupled with the imaging assembly, and which receives the generated image produced by the imaging assembly, and which further identifies undesirable produce, and non-produce related objects in the generated image; and
an ejector assembly positioned downstream relative to the imaging assembly, and which is operationally coupled with the controller, and which further removes selective, undesirable produce, and non-produce related objects from the produce stream, and which were earlier identified by the controller from the image formed by the imaging assembly.

14. A sorting apparatus, comprising:
a vibratory conveyor for transporting a produce stream formed of individual produce, and which has both desirable and undesirable sized produce, and which further includes a liquid component which is derived, at least in part, from the produce stream, and other undesirable non-produce related objects, and wherein the vibratory conveyor has a first, intake end, and a second, discharge end, and wherein the vibratory conveyor has a product conveying surface which defines a path of travel for the produce stream when the vibratory conveyor imparts vibratory motion to the product conveying surface, and wherein the produce stream delivered to the first, intake end, moves thereover under the influence of the vibratory motion, and is reduced to a single layer in height, and which is further spread substantially uniformly over a width dimension of the product conveying surface, and wherein the product conveying surface causes the produce stream to move along a non-linear course of travel between the first, intake end, and the second, discharge end of the vibratory conveyor as the produce stream transverses the product conveying surface, and wherein the produce stream has a horizontal and a vertical component of movement which diminishes as the produce stream moves from the first, intake end, and in the direction of the second end, and along the product conveying surface such that the produce stream falls substantially, immediately, vertically, downwardly from the second, discharge end of the vibratory conveyor, and wherein the liquid component of the produce stream is substantially separated from the produce stream by both the product conveying surface, and a product separation surface which is located in spaced relation relative to the second, discharge end of the vibratory conveyor, and further travels gravitationally, downwardly, along a liquid pathway which is located below the product conveying surface; and
a pair of vibratory motors which are individually mounted on the vibratory conveyor, and which, when energized, imparts vibratory energy into the vibratory conveyor to cause the product conveying surface to reciprocate, and impart movement to the produce stream which is deposited on the first intake end of the vibratory conveyor, and wherein the produce stream travels from the first intake end to the second discharge end of the vibratory conveyor, and wherein the respective vibratory motors, when energized, produces the vibratory force along a given stroke angle, which is measured relative to the product conveying surface, and wherein the given stroke angle is variable across about an 8 degree horizontal arc, and about a 14 degree vertical arc.

15. A sorting apparatus, as claimed in claim 14, and wherein the product conveying surface has a first region which defines a multiplicity of parallel, spaced ridges, and troughs, each having a predetermined height, and width dimensions, and which are located in predetermined locations across the width dimension of the product conveying surface, and which further induce the produce stream to roll forwards and backwards as the vibratory motion is imparted to the product transporting surface so as to cause the produce stream to singulate into individual produce, and to further separate from the undesirable, non-produce related objects which might be adhering to the individual produce forming the produce stream.

16. A sorting apparatus, as claimed in claim 15, and wherein the product conveying surface has formed therein a second region which defines a multiplicity of elongated converging and diverging apertures, which are spaced at predetermined locations, across the width dimension of the product transporting surface, and which individually frictionally engage the individual produce forming the produce stream as the produce stream moves along the non-linear course of travel so as to induce the produce stream to form a single layer in height, and to further spread the produce forming the produce stream substantially uniformly across the product conveying surface, and which further permits undesirable, undersized produce; undesirable non-produce related solid objects; and the liquid component of the produce stream to fall gravitationally, downwardly, through the respective elongated converging and diverging apertures of the product conveying surface, and wherein the second region having the multiplicity of elongated converging and diverging apertures causes the individual produce forming the produce stream to move in the non-linear course of movement between the first, intake end and the second, discharge end of the vibratory conveyor.

17. A sorting apparatus, as claimed in claim 16, and wherein the product conveying surface has a third region which defines a multiplicity of elongated transverse slots, which are located in predetermined spaced relation across the width dimension of the produce conveying surface, and which further induces the product stream to roll thereover, and wherein undesirable, non-produce related objects, and individual undersized produce, and any remaining liquid component of the produce stream moves gravitationally, downwardly through the respective transverse slots.

18. A sorting apparatus, as claimed in claim 17, and wherein the product conveying surface has a fourth region defined by a multiplicity of narrow transverse slots, which are spaced across the width dimension of the product conveying surface, and near the second, discharge end thereof, and which permits the liquid component of the produce stream to move gravitationally downwardly from the product transporting surface.

19. A sorting apparatus as claimed in claim 18, and wherein the multiplicity of parallel spaced ridges and troughs, are located near the first, intake end of the product conveying surface.

20. A sorting apparatus as claimed in claim 19, and wherein the multiplicity of elongated converging and diverging apertures are located downstream relative to the multiplicity of parallel spaced ridges and troughs.

21. A sorting apparatus as claimed in claim 20, and wherein the multiplicity of parallel spaced ridges have individual peaks, and the troughs defines valleys and where the peak-to-peak measurement is 40 mm to 60 mm, and the respective peak to valley assessment is 8 mm to 15 mm, and wherein the respective peak to peak and peak to valley measurement, extend across a width dimension of the product conveying surface.

22. A sorting apparatus as claimed in claim 21, and wherein the multiplicity of elongated converging and diverging apertures have a length dimension of 85 mm to 190 mm, and a width dimension of 5 mm to 8 mm.

23. A sorting apparatus as claimed in claim 22, and wherein the multiplicity of substantially transverse slots have a length dimension of 25 mm to 100 mm, and a width dimension of 4 mm to 8 mm.

24. A sorting apparatus as claimed in claim 22, and wherein the multiplicity of narrow apertures have a length dimension of 200 mm to 400 mm, and a width dimension of 5 mm to 8 mm.

25. A sorting apparatus as claim in claim 24, and wherein the reciprocation of the product conveying surface causes the individual produce located near the first intake end of the vibratory conveyor to have both the vertical and horizontal movement component, and the individual produce located near the second, discharge end of the vibratory conveyor to have a diminished vertical and horizontal component of motion.

26. A sorting apparatus as claimed in claim 14, and wherein the produce stream delivered to the first intake end has a first weight which diminishes as the produce stream moves from the first, intake end, to the second, discharge end of the vibratory conveyor.

27. A sorting apparatus as claimed in claim 14, and further comprising:
  an imaging assembly positioned downstream relative to the second, discharge end of the product conveying surface, and which further produces a generated image of the produce stream which is falling downwardly, from the second, discharge end;
  a controller operably coupled with the imaging assembly, and which further receives the generated image produced by the imaging assembly, and which further identifies undesirable produce, and non-produce related objects in the generated image; and
  an ejector assembly positioned downstream relative to the imaging assembly, and which is operationally coupled with the controller, and which further removes selective, undesirable produce, and non-produce related objects from the produce stream, and which were earlier identified by the controller from the image formed by the imaging assembly.

28. A sorting apparatus, comprising:
  a vibratory conveyor having a first, intake end, and a second, discharge end, and wherein a produce stream to be sorted is deposited on the first, intake end, and travels to the second, discharge end, and then falls substantially uniformly, vertically, downwardly along a path of travel, and wherein the produce stream to be sorted, when deposited on the first intake end, has a first weight, and the produce stream leaving the second, discharge end of the vibratory conveyor has a second weight, which is substantially less than the first weight, and wherein the produce stream includes both desirable and undesirable sized produce, and further includes a liquid component which is derived, at least in part, from the produce stream, and the other undesirable non-produce related objects, and wherein at least some of the undesirable sized produce; liquid component; and other undesirable non-produce related objects pass vertically downwardly through the vibratory conveyor as the produce stream moves from the first intake end, to the second discharge end thereof;

a product conveying surface which is borne by the vibratory conveyor and which further supports the produce stream formed of the individual produce, and non-produce related objects as the produce stream moves from the first, intake end, to the second, discharge end of the vibratory conveyor and under the influence of a source of vibratory motion imparted to the vibratory conveyor, and wherein the product conveying surface is effective in causing the produce stream to be distributed substantially uniformly, and in a single layer across a width dimension of the product conveying surface, and wherein the product conveying surface causes the individual produce and non-produce related objects forming, at least a portion of the produce stream to move along a non-linear course of travel between the first, intake end, and the second, discharge end of the vibratory conveyor, and wherein the vibratory motion causes the individual produce to have both a vertical and horizontal component of motion, and wherein the produce stream moving along the product conveying surface between the first, and second ends, of the vibratory conveyor has a given substantially horizontal speed of movement, and wherein the product conveying bed is effective in substantially reducing the vertical and horizontal components of motion of the produce such that the produce stream falls substantially uniformly, vertically downwardly and through an inspection station, and wherein the imaging assembly is located in the inspection station;

a first region of the product conveying surface, and which defines a multiplicity of parallel, spaced ridges, and troughs, each having a predetermined height, and width dimensions, and which are located in predetermined locations across the width dimension of the product conveying surface, and which further induces the produce stream to spread substantially uniformly, and transversely across the width of the conveying surface as vibratory motion is imparted to the product conveying surface so as to cause the produce stream to singulate into individual produce, and to further separate from the undesirable, non-produce related objects which are adhering to the individual produce forming the produce stream;

a second region of the product conveying surface, and which defines a multiplicity of elongated converging and diverging apertures, which are spaced at predetermined locations, across the width dimension of the product transporting surface, and which individually, frictionally, engage the individual produce forming the produce stream so as to induce the produce stream to form a single layer in height, and to further spread the produce forming the produce stream substantially uniformly across the product transporting surface, and which further permits undesirable, undersized produce; undesirable non-produce related solid objects; and the liquid component of the produce stream to fall gravitationally, downwardly, through the respective elongated converging and diverging apertures of the product transporting surface, and wherein the multiplicity of elongated converging and diverging apertures cause the individual produce forming the produce stream to move in the non-linear course of movement between the first, intake end and the second, discharge end of the vibratory conveyor;

a third region of the product conveying surface and which defines a multiplicity of substantially transverse apertures, which are located in predetermined spaced relation across the width dimension of the product conveying surface, and which induces the product stream to roll thereover, and wherein undesirable non-produce related objects and individual undersized produce, and any remaining liquid component of the produce stream moves gravitationally, downwardly through the respective transverse slots, and wherein the respective substantially transverse apertures further reduces the speed of movement of the produce stream which is induced by the vibratory motion imparted to the product conveying surface before the produce stream departs from the second, discharge end of the vibratory conveyor;

a fourth region of the product conveying surface and which defines a multiplicity of transverse slots, which are spaced across the width dimension of the product conveying surface, and near the second, discharge end thereof, and which permits the liquid component of the produce stream to move gravitationally, downwardly, from the product conveying surface;

an imaging assembly positioned downstream relative to the second, discharge end of the vibratory conveyor, and which generates an image of the produce stream which is falling substantially vertically, downwardly relative to the second, discharge end of the product conveying surface of the vibratory conveyor;

a controller operably coupled with the imaging assembly, and which receives the generated image produced by the imaging assembly, and which further identifies any undesirable produce, and non-produce related objects within the produce stream, and which appear in the generated image; and an ejector assembly positioned downstream relative to the imaging assembly and which is operably coupled with the controller, and which selectively removes the undesirable produce, and non-produce related objects from the produce stream and which are identified from the generated image formed by the controller.

29. A sorting apparatus as claimed in claim 28, and wherein the first region which defines a multiplicity of parallel spaced ridges, and troughs, is located near the first intake end of the product conveying surface.

30. A sorting apparatus as claimed in claim 29, and wherein the second region which defines the multiplicity of elongated converging and diverging apertures, is located downstream relative to the multiplicity of parallel spaced ridges, and troughs.

31. A sorting apparatus as claimed in claim 30, and wherein the third region which defines the substantially transverse apertures is located downstream of the multiplicity of elongated converging and diverging apertures.

32. A sorting apparatus as claimed in claim 31, and wherein the fourth region, which defines the multiplicity of transverse slots, is located downstream of the substantially transverse apertures, and upstream relative to the discharge end of the vibratory conveyor.

* * * * *